(12) United States Patent
Burch et al.

(10) Patent No.: US 10,992,706 B2
(45) Date of Patent: Apr. 27, 2021

(54) DETECTION OF CYBER ATTACKS FROM HIGH-FREQUENCY HASHED INCORRECT PASSWORDS

(71) Applicant: NetIQ Corporation, Houston, TX (US)

(72) Inventors: Lloyd Burch, Provo, UT (US);
Michael F. Angelo, Houston, TX (US);
Baha Masoud, Sunnyvale, CA (US)

(73) Assignee: NETIQ CORPORATION, Houston, TX (US)

( * ) Notice: Subject to any disclaimer, the term of this patent is extended or adjusted under 35 U.S.C. 154(b) by 103 days.

(21) Appl. No.: 16/399,243

(22) Filed: Apr. 30, 2019

(65) Prior Publication Data
US 2020/0351299 A1    Nov. 5, 2020

(51) Int. Cl.
*H04L 29/06*    (2006.01)
*G06F 16/901*    (2019.01)

(52) U.S. Cl.
CPC ...... *H04L 63/1466* (2013.01); *G06F 16/9014* (2019.01); *H04L 63/083* (2013.01); *H04L 63/1416* (2013.01)

(58) Field of Classification Search
CPC .............. H04L 63/1466; H04L 63/083; H04L 64/1416; G06F 16/9014
See application file for complete search history.

(56) References Cited

U.S. PATENT DOCUMENTS

| 9,059,989 | B2 | 6/2015 | Kurkure |
| 10,063,571 | B2 | 8/2018 | Be'ery et al. |
| 10,129,298 | B2 | 11/2018 | Grady et al. |
| 2014/0310763 | A1* | 10/2014 | French .................. H04W 12/06 726/1 |
| 2017/0214712 | A1* | 7/2017 | Maxwell ................. G06F 21/46 |
| 2017/0318054 | A1 | 11/2017 | Vissamsetty et al. |
| 2018/0375886 | A1 | 12/2018 | Kirti et al. |

OTHER PUBLICATIONS

Cottingham, G., "How Azure Security Center unveils suspicious PowerShell attack", Cloud Security Investigations & Intelligence—Microsoft Azure, Big Data Blog, /en-in/blog/topics/big-data, Oct. 12, 2017.
Batra, R., "Preventing Brute Force Attacks with Drupal Login Security Module", Open Sense Labs, Aug. 20, 2018.
Hornby, T., "Salted Password Hashing—Doing it Right", Code Project, Feb. 14, 2016.
Vestergaard, Johnny; https://github.com/johnnykv/heralding; 2019 GitHub, Inc.; 3 Pages.

\* cited by examiner

*Primary Examiner* — Ellen Tran

(57) ABSTRACT

Response to incorrect passwords being entered for usernames in attempts to access a computing system, each incorrect password is one-way hashed. The hashed incorrect passwords are stored within a database. High-frequency hashed incorrect passwords are determined from the stored hashed incorrect passwords. Each high-frequency hashed incorrect password corresponds to an incorrect password that was entered more than a threshold number of the attempts, regardless of the username for which the incorrect password was entered in any attempt. That the computing system is being subjected to a cyber attack is detected based on the determined high-frequency hashed incorrect passwords.

20 Claims, 11 Drawing Sheets

DETECTION OF CYBER ATTACKS FROM HIGH-FREQUENCY HASHED INCORRECT PASSWORDS

BACKGROUND

A significant if not the vast majority of computing devices are globally interconnected to one another via the Internet. While such interconnectedness has resulted in services and functionality almost unimaginable in the pre-Internet world, not all the effects of the Internet have been positive. A downside, for instance, to having a computing device potentially reachable from nearly any other device around the world is the computing device's susceptibility to malicious cyber attacks that likewise were unimaginable decades ago.

DETAILED DESCRIPTION

Figure 1:
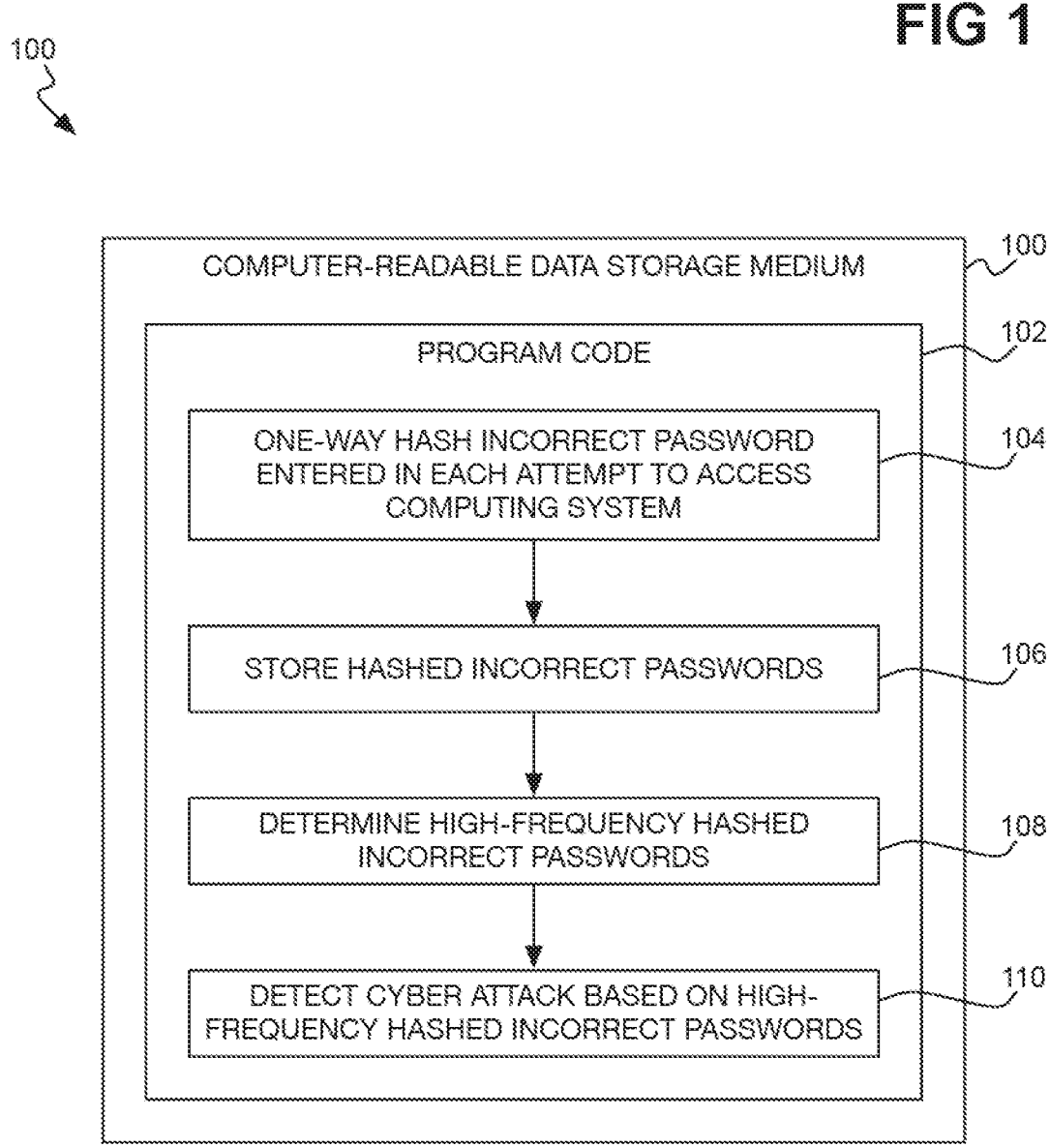
FIG. 1 is a diagram of an example non-transitory computer-readable data storage medium storing program code for detecting cyber attacks from high-frequency hashed incorrect passwords.

As noted in the background, a large percentage of the world's computing devices can communicate with one another over the Internet, which is generally advantageous. Computing devices like servers, for instance, can provide diverse password-protected services, including email, remote computing device access, electronic commerce, financial account access, and so on. In general, for such computing system-provided services, users establish accounts and then can access the accounts by providing usernames associated with the accounts and corresponding passwords that if entered correctly permit access. The term "username" is used herein generally, and encompasses an account name associated with an account, which may or may not be the actual name of a particular user.

As also noted in the background, the interconnection of computing devices does render the computing devices susceptible to cyber attack. Computing systems that restrict access by usernames and passwords, for instance, are susceptible to hackers and other nefarious parties gaining illegitimate access by correctly guessing passwords for usernames. The usernames may be known, or may also be guessed, both randomly and in accordance with assumed naming conventions used in generating the usernames. For example, email addresses for an organization may generally be in the form of "firstname.lastname@organization.com," such that knowing (or guessing) the names of people affiliated with the organization effectively means that the usernames email accounts can be easily determined.

Traditionally computing systems that restrict access by usernames and passwords have been susceptible to so-called "brute force" and "dictionary" cyber attacks, in which hackers try a large number of passwords for a large number of usernames until they gain illegitimate access. A nefarious party may have commandeered a number of "bots"—computing devices of legitimate users connected to the Internet but at which the party has installed malware to permit the nefarious party to control the devices—from which the party can originate a large number of attempts to access a computing system using different passwords for the same or different usernames. Such attacks have lessened more recently, because most computing systems will at least temporarily suspend access via a given username once a threshold number of incorrect passwords have been attempted for the username within a relatively short period of time.

Furthermore, computing systems typically log unsuccessful access attempts. Therefore, the computing systems can be configured to detect spikes in large numbers of accounts for which the threshold number of incorrect passwords have been exceeded. For example, a sustained brute force attack on the accounts of a computing system can result in an unusual increase in the number of accounts that are suspended due to too many incorrect passwords having been entered in a relatively short period of time. The computing system can thus discern that it is being subjected to a cyber attack in this respect.

As a result, hackers are deploying more sophisticated cyber attacks to get around limits in the number of unsuccessful attempts that can be made to guess passwords associated with account usernames, in such a way as to avoid cyber attack detection at the computing systems. A nefarious party may perform a cyber attack very slowly, over a number of hours, days, weeks, or even longer. The party generates or acquires a list of passwords to try, and a corresponding list of usernames against which to try each password. The usernames may be known, generated in accordance with an assumed naming scheme as noted above, and so on. For each username, the nefarious party tries each password within the list. The attacker may try just a few passwords for each username per hour (or even more slowly), so that the attacker does not raise suspicion by avoiding any username being restricted due to the entry of too many incorrect passwords for the username within a short period of time.

Detection of this type of "slow" cyber attack is difficult, because it does occur over a relatively long period of time. Even if logged by the computing system at which access is being attempted, the unsuccessful access attempts can become lost in the noise of "legitimate" unsuccessful access attempts. For instance, it is not uncommon for legitimate accountholders to forget or mistype their usernames, passwords, or both. The illegitimate unsuccessful access attempts made by a hacker can thus become lost among such legitimate access attempts, and are not detected as being a cyber attack on the computing system in question.

Techniques described herein provide for cyber attack detection in such instances. When incorrect passwords are entered for usernames in attempts to access a computing system, the incorrect passwords are each one-way hashed and the resulting hashed incorrect passwords (i.e., the one-way hashes of the incorrect passwords) are stored within a database. High-frequency hashed incorrect passwords (i.e., one-way hashes stored in the database for incorrect passwords that were attempted with high frequency) can then be determined—regardless of the usernames for which the corresponding incorrect passwords were entered. A cyber attack is detected based on these identified high-frequency hashed incorrect passwords.

For example, a nefarious party may attempt each of the same passwords for each of a large number of different usernames. As such, a given incorrect password is attempted for many different usernames. The likelihood that so many different accountholders will legitimately enter the same incorrect password by mistake to access a computing system is low. Therefore, even though the number of unsuccessful attempts for any username remains sufficiently low so as to not raise suspicion that the computing system is being subjected to a cyber attack, the fact that identical incorrect passwords are being tried for a relatively large number of usernames may nevertheless be sufficient to warrant conclusion that the computing system is undergoing attack.

The techniques described herein, in other words, focus on detecting the same incorrect password(s) being tried in multiple unsuccessful access attempts, regardless of the usernames for which the passwords were entered in these attempts. One-way hashing the incorrect passwords, and detecting cyber attacks based on these stored hashed incorrect passwords (i.e., based on the one-way hashes of the incorrect passwords), rather than based on the incorrect passwords themselves, which may be discarded once they have been hashed, is also of value. If the database storing the one-way hashes is compromised, for instance, the incorrect passwords that were attempted cannot be gleaned and remain unknown, limiting the value of this information.

FIG. 1 shows an example non-transitory computer-readable data storage medium 100. The computer-readable data storage medium 100 stores program code 102. A computing system executes the program code 102 to perform processing to detect cyber attacks from high-frequency hashed incorrect passwords.

The processing includes, responsive to incorrect passwords being entered for usernames in attempts to access the computing system, one-way hashing each incorrect password (104). Hashing an incorrect password means inputting the password to a specified hashing algorithm or function. The phrase "the hashed incorrect password" as used herein refers to the hash that the hashing algorithm or function generates for the incorrect password.

The hashing is one-way hashing in that the employed hashing algorithm or function is a one-way hash algorithm. This means that the hashing is "one way": the hash of an incorrect password can be determined if the incorrect password is known, but the incorrect password cannot be determined from the hash. That is, there is no way to reverse a hash to yield the incorrect password from which the hash was generated.

The hashing algorithm or function may also receive as an input a hash seed or "salt." The hashing algorithm or function therefore generates a hash for the incorrect password from the incorrect password and the hash seed if a hash seed is employed. Using a hash seed mitigates dictionary attacks to the degree that an attacker cannot practically precompute the hashes for passwords, because the hashes also depend on the hash seed. Using a hash seed mitigates attacks using rainbow tables, which are precomputed tables for reversing hashing functions.

The processing includes storing the hashed incorrect passwords in a database (106). That is, the one-way hashes of the incorrect passwords are stored in the database. The incorrect passwords themselves are not stored in the database, and may be discarded at some point after the passwords have been hashed. For instance, for the incorrect password that is entered for a username in a given access attempt of the computing system, the incorrect password may be discarded as soon as the incorrect password has been hashed and stored in the database.

The database thus stores the incorrect password entered at each unsuccessful access attempt of the computing system. If an incorrect password has been entered three times (i.e., in three times unsuccessful attempts), for example, then it appears three times in the database, regardless of the username for which the incorrect password was entered in either attempt. The incorrect password may have been entered one time for each of three different usernames in three different unsuccessful access attempts. The incorrect password may have been entered twice for one username in two different unsuccessful attempts, and once for a different username in a different unsuccessful attempt, and so on.

The processing includes determining high-frequency hashed incorrect passwords from the hashed incorrect passwords stored in the database (108). Each high-frequency hashed incorrect password corresponds to an incorrect password that was entered more than a threshold number of unsuccessful attempts to gain access to the computing system, regardless of the username for which the password was entered in any unsuccessful attempt. That is, a high-frequency hashed incorrect password is a hash of a particular incorrect password used in more than the threshold number of unsuccessful attempts, regardless of the username for which the password in question was entered in any such attempt.

The processing includes detecting a cyber attack based on the high-frequency hashed incorrect passwords (110). For instance, a cyber attack may be detected if the number of high-frequency hashes itself is greater than a threshold (different from the threshold number on which basis the high-frequency hashes themselves are identified). As an example, if more than five different incorrect passwords are each used in more than the threshold number of unsuccessful access attempts, regardless of the username for which each password was entered in any unsuccessful attempt, then it may be concluded that the computing system is being subjected to a cyber attack.

In this example, the threshold is five, but the threshold can be as low as zero. If the threshold is zero, then the processing of part 110 raises suspicion, such as in the form of an alert, of a possible cyber attack as soon as any hash has been stored in the database more than a threshold number of times, and thus is a high-frequency hash of a corresponding incorrect password. Detecting the cyber attack based on the high-frequency hashed incorrect passwords involves analysis of the hashes resulting from hashing the incorrect passwords, and does not involve analysis of the incorrect passwords themselves.

As such, the cyber attack is not detected based on what any particular password actually is. Rather, the cyber attack is detected based on the number of times any password is used in unsuccessful access attempts, regardless of the username for which the password was tried in any unsuccessful attempt. More specifically, the cyber attack can be detected based on the number of such high-frequency passwords having been attempted. The analysis that underlies this detection further is based not on the passwords themselves, but on the hashes of the passwords, as noted above.

Figure 2:
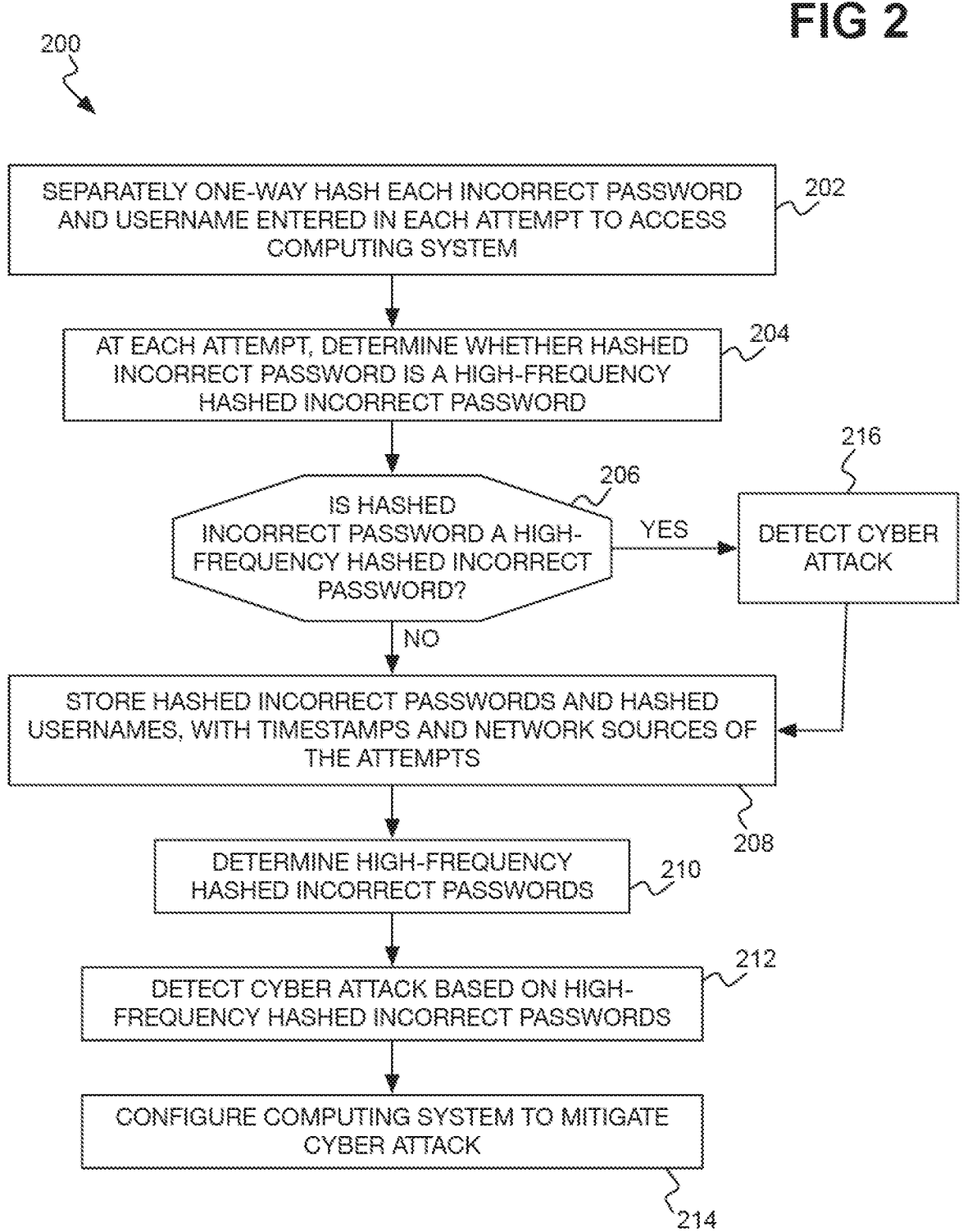
FIG. 2 is a flowchart of an example method for detecting cyber attacks from high-frequency hashed incorrect passwords, consistent with FIG. 1.

FIG. 2 shows an example method 200 for detecting cyber attacks based on high-frequency hashed incorrect passwords that is consistent with but more detailed than the processing of FIG. 1. The method 200 may be performed by the computing system. The method 200 may be implemented as program code stored on a non-transitory computer-readable data storage medium, such as the program code 102 stored on the computer-readable data storage medium 100 of FIG. 1.

In the example of FIG. 2, at each unsuccessful attempt to access a computing system using a username and an incorrect password for the username (202), the computing system separately one-way hashes each of the incorrect password and the username that have been entered. Therefore, the result of part 202 for an unsuccessful access attempt includes two one-way hashes: a hash of the incorrect password, and a hash of the username. The incorrect password and the username may both be hashed using the same hashing algorithm or function, and may be hashed using the same hash seed (if any).

At each unsuccessful attempt, the computing system determines whether the hashed incorrect password is a high-frequency hashed incorrect password (204). The hash of the incorrect password entered in a current unsuccessful access attempt, in other words, may be compared against a previously determined list of high-frequency hashed incorrect passwords. In the example of FIG. 2, at any unsuccessful attempt, if the hash of the incorrect password entered at the attempt is such a high-frequency hashed incorrect password (206), then the computing system detects that a cyber attack is occurring (216).

The likelihood that a legitimate user will incorrectly enter the password for the username of his or her account in such a way as to match an incorrect password that has been used with high frequency in prior unsuccessful attempts to access the computing system (regardless of the usernames for which the password was entered in these prior attempts) is low. Similarly, the likelihood that the actual password for an account is an incorrect password that has been used with high frequency in prior unsuccessful access attempts (regardless of the usernames for which the password was entered in these prior attempts), but that the legitimate user misspelled the username of the account when entering the password is low. Therefore, the computing system can conclude that the system is being subjected to a cyber attack when an incorrect password has been entered in a current unsuccessful access attempt that was previously entered (regardless of username) in prior unsuccessful attempts at high frequency.

The computing system stores the hashed incorrect passwords and the hashed usernames within a database (208). The computing system can also store the timestamps at which the corresponding unsuccessful access attempts were made, as well as the network sources of the attempts, by network port and/or network address, for instance. Therefore, for each unsuccessful access attempt, there is an entry in the database including the hash of the incorrect password that was entered in the attempt, the username for which the incorrect password was entered in the attempt, a timestamp of the time and date at which the attempt was made, and the network source from which the attempt originated. At a minimum, just the hashed incorrect password is stored. For instance, just the hashed incorrect password may be stored, or the hashed incorrect password and other information may be stored but not the hashed username.

Storing additional information, besides the hashed incorrect passwords, permits the performance of later analysis to detect commonalities of unsuccessful access attempts to the computing system. For instance, by storing the hashed usernames entered with the hashed incorrect passwords, the database permits determination of the number of different usernames for which any incorrect password has been entered. Furthermore, the database permits determination of the number of incorrect passwords that have been entered for any username. The stored timestamps and network sources can similarly be used to perform analysis by time period and to identify commonalities in the origination of the unsuccessful access attempts.

The computing system determines the high-frequency hashed incorrect passwords from the hashed incorrect passwords that have been stored in the database (210). The computing system can determine whether a cyber attack is occurring based on these high-frequency hashed incorrect passwords (212). Parts 210 and 212 can be performed as has been described in relation to parts 108 and 110 of FIG. 1, respectively.

Cyber attack detection in part 212 can differ from cyber attack detection in part 216. Part 216 occurs as unsuccessful access attempts are made, and each time an unsuccessful access attempt is made. By comparison, part 212 can occur periodically, and not necessarily as unsuccessful access attempts are made. For example, when an unsuccessful attempt has been made, the computing system may in realtime detect a cyber attack in part 216 if the hash of the incorrect password entered in the attempt is one of the high-frequency hashed incorrect passwords that was previously identified.

By comparison, the computing system may just periodically, such as every few hours, every night, and so on, analyze the hashed incorrect passwords that are stored in the database in part 208 when the unsuccessful attempts are made. This periodic analysis includes the determination of high-frequency hashed incorrect passwords in part 210, which may be added to the list of such high-frequency hashed incorrect passwords determined in prior time periods. As such, the cyber attack detection in part 212 may occur periodically, as the database is analyzed to identify new high-frequency hashed incorrect passwords. Even if a cyber attack is not detected in part 212, the newly identified high-frequency hashed incorrect passwords are used the next time an unsuccessful access attempt is made in part 204.

Responsive to a cyber attack having been detected in part 212 or 216, the computing system can be configured to mitigate the cyber attack (214). For example, if multiple-factor authentication (MFA) is not presently enabled, then it may be enabled. The enablement may be for a temporary period of time, such that 2FA is required every time any account is attempted to be accessed, even if a given account is accessed more than once. The enablement may be a one-time enablement, such that MFA is required for every account the next time each account is accessed, and once access is successful for a given account, MFA is not required for that account.

MFA, including two-factor authentication (2FA), is an authentication process by which access is granted only if two or more pieces of evidence, or factors, are successfully presented. For example, in addition to the correct password having to be entered for a username associated with an account, a one-time code may have to be successfully entered. The one-time code may be sent via an email to an email address associated with the account, via a text message to a phone number associated with the account, and so on.

The computing system may be configured to mitigate the cyber attack in other ways as well. If the cyber attacks are originating from a particular range of network addresses or from a particular global of region, access may be temporarily restricted from this particular address range or region, or MFA may be enabled just as to access attempts originating from this particular address range or region. The number of incorrect tries for a password to be entered for a username until the associated account is temporarily suspended may be reduced at least temporarily, as another mitigation technique.

Figure 3:
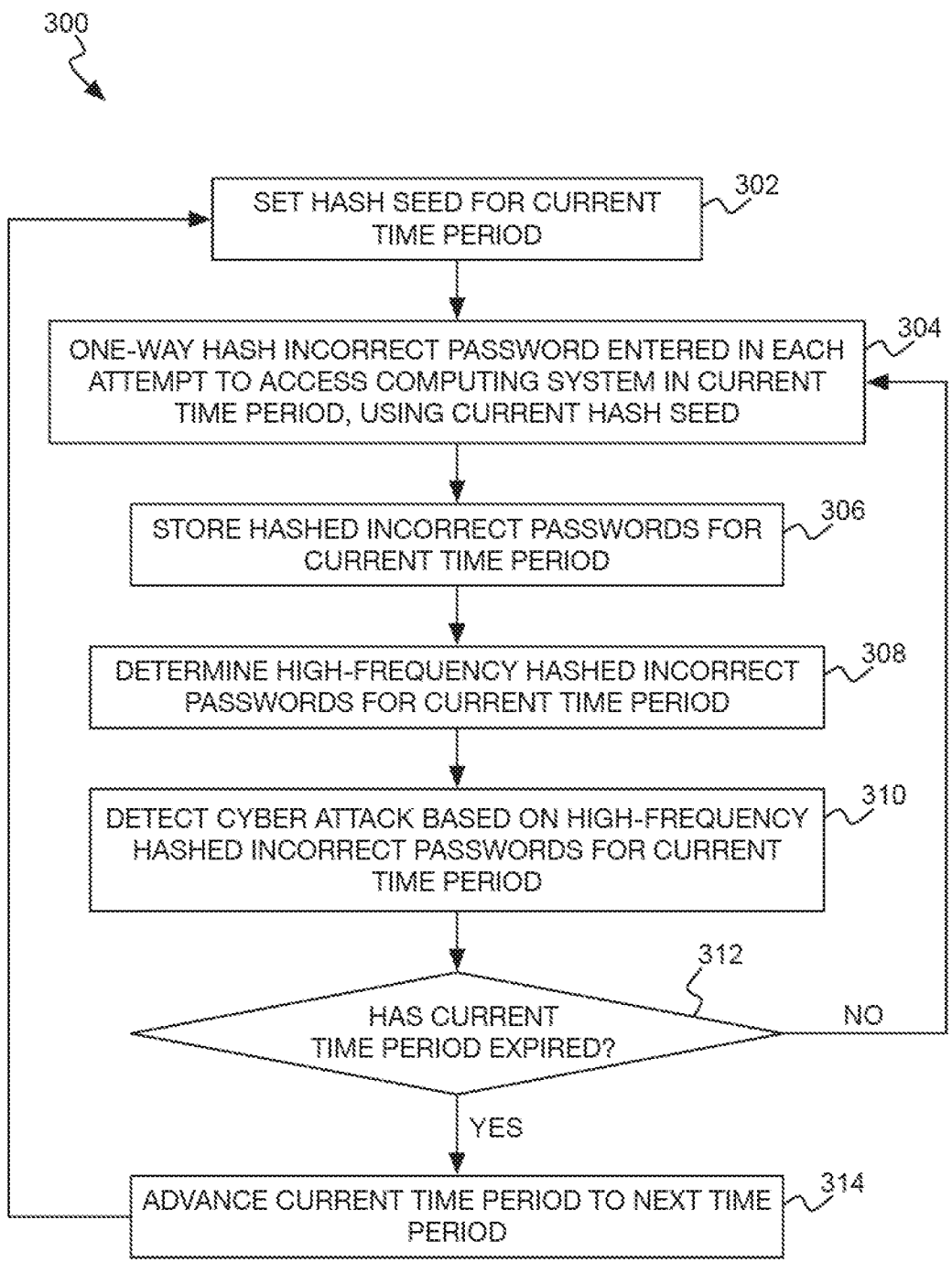
FIG. 3 is a flowchart of an example method for detecting cyber attacks based on high-frequency hashed incorrect passwords, consistent with FIGS. 1 and 2, and in which the hash seed used to generate hashes changes between time periods.

FIG. 3 shows another example method 300 for detecting cyber attacks based on high-frequency hashed incorrect passwords. The method 300 is consistent with but more detailed than the process of FIG. 1. Furthermore, the method 300 can be combined with the method 200 of FIG. 2. Like the method 200, the method 300 may be performed by a computing system, and may be implemented as program code stored on a non-transitory computer-readable data storage medium, such as the program code 102 stored on the computer-readable data storage medium 100 of FIG. 1.

The example method 300 uses a one-way hashing algorithm or function that inputs a hash seed as well as an incorrect password, and thus generates a one-way hash of the incorrect password using the input hash seed. In the method 300, this hash seed changes periodically. Therefore, for a current time period, the computing system sets a hash seed (302). The computing system may set the hash seed by randomly, or in another manner, generating the hash seed itself, or the computing system may receive the hash seed, such as from a central attack-monitoring service as described later in the detailed description.

The computing system one-way hash the incorrect password entered in each unsuccessful attempt to access the computing system in the current time period using the current hash seed (304). The computing system stores the hashed incorrect passwords for the current time period within a database (306). For each unsuccessful access attempt in the current time period, the computing system therefore stores the hashed incorrect password used in the unsuccessful access attempt, where this one-way hash was determined using the current hash seed.

In FIG. 3, the plain hash of each incorrect password (i.e., the hash of each incorrect password generated without using a hash seed as "salt" within a hashing algorithm) may also be generated and stored in parts 304 and 306. This ensures that the one-way hashes, with the hash seeds, can be shared between computing systems, while the "regular" hash of each incorrect password (i.e., the hash of each password generated using a hash seed as "salt" within a hashing algorithm) is stored locally and not shared. In another implementation, the hash seed may be a wrapper for the hash of each incorrect password, so that incorrect password usage across time periods that otherwise result in different hashes can still be detected.

The computing system determines high-frequency hashed incorrect passwords for the current time period (308). Part 308 can be performed as has been described above in relation to part 108 of FIG. 1. The computing system can further detect a cyber attack based on the high-frequency hashed incorrect passwords determined for the current time period (310). Part 310 can be performed as has been described in relation to part 110 of the method 100.

If the current time period has not yet expired (312), then the computing system proceeds back to part 304, continuing to one-way hash incorrect passwords entered in unsuccessful access attempts of the computing system using the set hash seed for the current time period. Once the current time period has expired (312), then the computing system advances to the next time period (314), which becomes the (new) current time period, and proceeds back to part 302, in which a new hash seed is set for the new current time period. The computing system thus one-way hashes incorrect passwords that are subsequently entered using the new hash seed that has been set.

The time periods may correspond to periods of hours, days, or longer. Hashing incorrect passwords using hash seeds that change over time periods can mitigate the severity of the resulting impact if the database of hashed incorrect passwords becomes compromised. Even if the hashing algorithm or function by which the incorrect passwords are hashed is known, whether and the number of times a given password has been used in unsuccessful access attempts can be determined just for the time periods for which the hash seeds are known. A nefarious party who has access to the database in its entirety but access to just a limited set of hash seeds (including the case in which the party has knowledge of just one hash seed) can perform such analysis just in relation to the time periods for the known hash seeds.

Furthermore, such a nefarious party is unable to perform analysis across time periods unless the party knows the hash seed used in each of these time periods. For example, the number of times a given password has been used in unsuccessful access attempts over two time periods can be determined just if the hash seed for each time period is known. This is because the same password will resolve to a different hash in each time period, even if the same hashing algorithm or function is known, since different hash seeds were used when hashing the password in different time periods.

When determining whether an incorrect password entered in an unsuccessful access attempt in the current time period is a previously determined high-frequency hashed incorrect password, the computing system may just hash the incorrect password using the hash seed for the current time period, and compare the hash to the high-frequency hashes that have already been determined for the current time period. In another implementation, the computing system may hash the incorrect password hash using the hash seed for the current time period and using the hash seed for each of a number of specified prior time periods. Therefore, the computing system can determine if the incorrect password in question has been used with high frequency in the current time period or in any of these other prior time periods.

In FIG. 3, then, the high-frequency hashed incorrect passwords are determined on a per-time period basis. As noted above, a high-frequency hashed incorrect password is a one-way hash of an incorrect password that was entered in more than a threshold number of unsuccessful access attempts, regardless of the username for which the incorrect password was entered in any such attempt. In the implementation of FIG. 3, when the high-frequency passwords are determined on a per-time period basis, this means that a high-frequency hashed incorrect password is a one-way hash of an incorrect password that was entered in more than the number of unsuccessful attempts in the specific time period corresponding to the hash seed used to generate the hash.

In other words, an incorrect password entered more than the threshold number of unsuccessful attempts over more than one time period may not be identified as a high-frequency incorrect password. This is because, as noted above, the hash of the incorrect password will differ from one time period to the next time period. The number of times each unique hash appears in the database corresponds to the number of unsuccessful access attempts the corresponding incorrect password was used during a given time period. For example, a given password may be one-way hashed to a first hash in a first time period, and to a second hash in a second time period. Because the given password itself is not stored in the database, that the first hash and the second hash each correspond to the same password cannot be determined from the database.

Therefore, to detect a cyber attack in part 110 of FIG. 1 or in part 212 of FIG. 2 when the hash seed changes every time period as in the example method 300, the cyber attack may be detected based on the high-frequency hashed incorrect passwords of the current time period. Following entry in the database of the incorrect password hash for the last unsuccessful access attempt during the current time period, and after the high-frequency hashed incorrect passwords for this time period have been determined, detecting a cyber attack on the basis of these high-frequency for this time period may be performed just one last time. This is because no additional incorrect password hashes that use the hash seed for the time period in question may be entered in the database. Rather, in the next time period, incorrect password hashes will be computed using a different hash seed, such that a cyber attack may then be detected based on high-frequency hashes stored in the database that are generated using this new hash seed.

Figure 4:
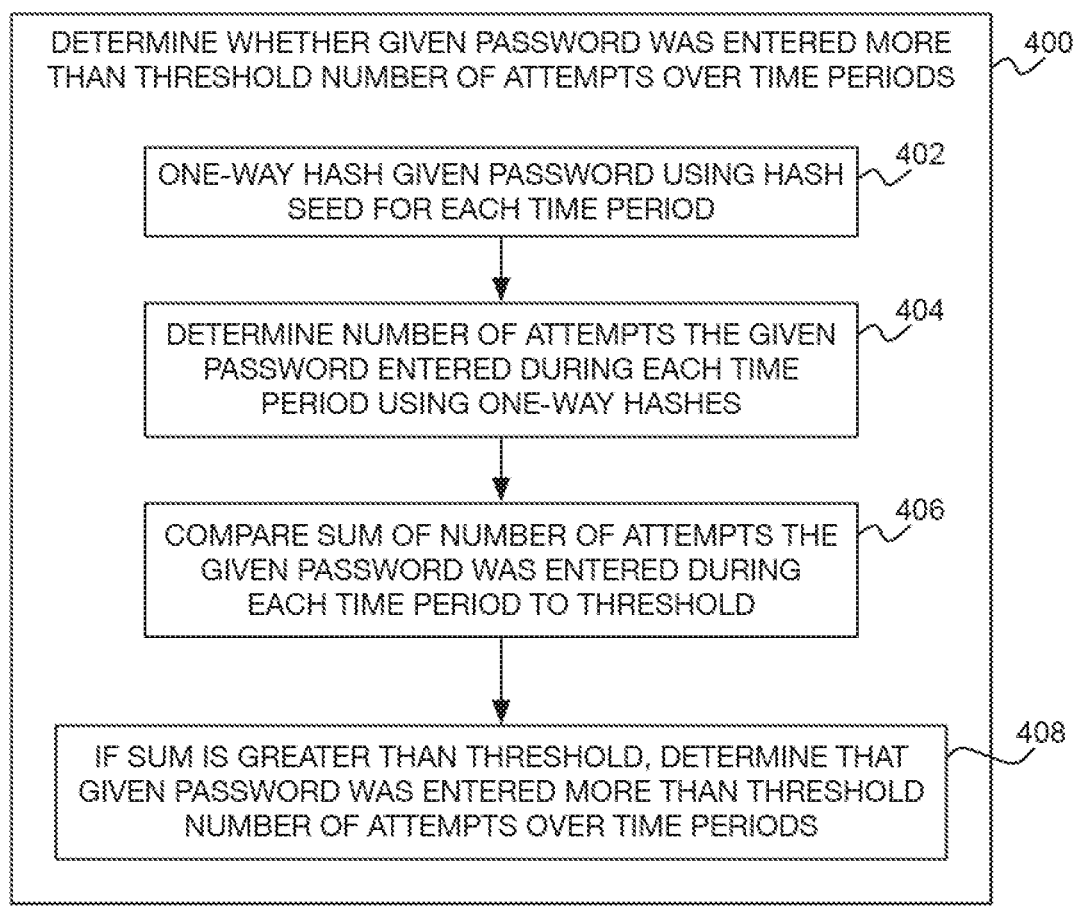
FIG. 4 is a flowchart of an example method for determining whether a given password was entered more than a threshold number of attempts across time periods, when incorrect passwords are hashed using hash seeds that periodically change as in FIG. 3.

FIG. 4 shows an example method 400 for determining whether a given password was entered more than a threshold number of attempts across time periods, when incorrect passwords are hashed using hash seeds that periodically change in accordance with the method 300. The example method 400, like the methods 200 and 300, can be performed by a computing system. Similarly, the method 400 can be implemented as program code stored on a non-transitory computer-readable data storage medium, such as the program code 102 stored on the computer-readable data storage medium 100 of FIG. 1.

For a given password, the computing system performs a one-way hash of the given password using the hash seed for each time period (402). For example, if the computing system is determining whether a given password was entered more than the threshold number of times in the time span encompassing both a first time period and an adjacent second time period, the computing system will perform the one-way hashing algorithm or function in question twice, once for each time period. The result thus includes two hashes of the given password: one for the first time period using the hash seed for the first time period, and another for the second time period using the hash seed for the second time period.

The computing system determines the number of attempts the given password was entered during each time period using the determined one-way hashes (404). For example, for each one-way hash, the computing system can query the database for the number of database entries including the hash. Even if the entries include just the hashes—and not, for instance, the timestamps of the attempts at which the passwords corresponding to the hashes were entered or the time period of each attempt—the number of times a given hash generated using a given hash seed appears in the database can still denote the number of unsuccessful attempts that the corresponding password was used in the time period corresponding to the hash seed in question. This is the case in which the hashing algorithm or function generates a unique hash for each combination of a hash seed and a password.

The computing system compares the sum of the determined number of attempts the given password was entered during each time period to a threshold (406). For example, the computing system may determine that the given password was entered a first number of times during a first time period because the hash of the password generated using a hash seed for the first time period appears in the database this first number of times. The computing system may determine that the given password was entered a second number of times during a second time period because the hash of the password generated using a hash seed for the second time period appears in the database this second number of times. The computing system therefore compares the sum of the first and second numbers of times to the threshold.

If the sum is greater than the threshold, the computing system can conclude that the given password was entered more than the threshold number of attempts over a time span encompassing the time periods in question (408). The method 400 therefore provides for a way to determine incorrect password usage across time periods when the hash seed varies by time period. Performing this analysis is on a per-password basis. That is, without starting from a password to input, along with the hash seed for each time period, to the hashing algorithm or function, incorrect password usage analysis across time periods is circumvented. This is because, as noted above, a hash generated for one time period is not comparable to a hash generated for another time period, since the same password will resolve to different hashes in different time periods.

Figure 5:
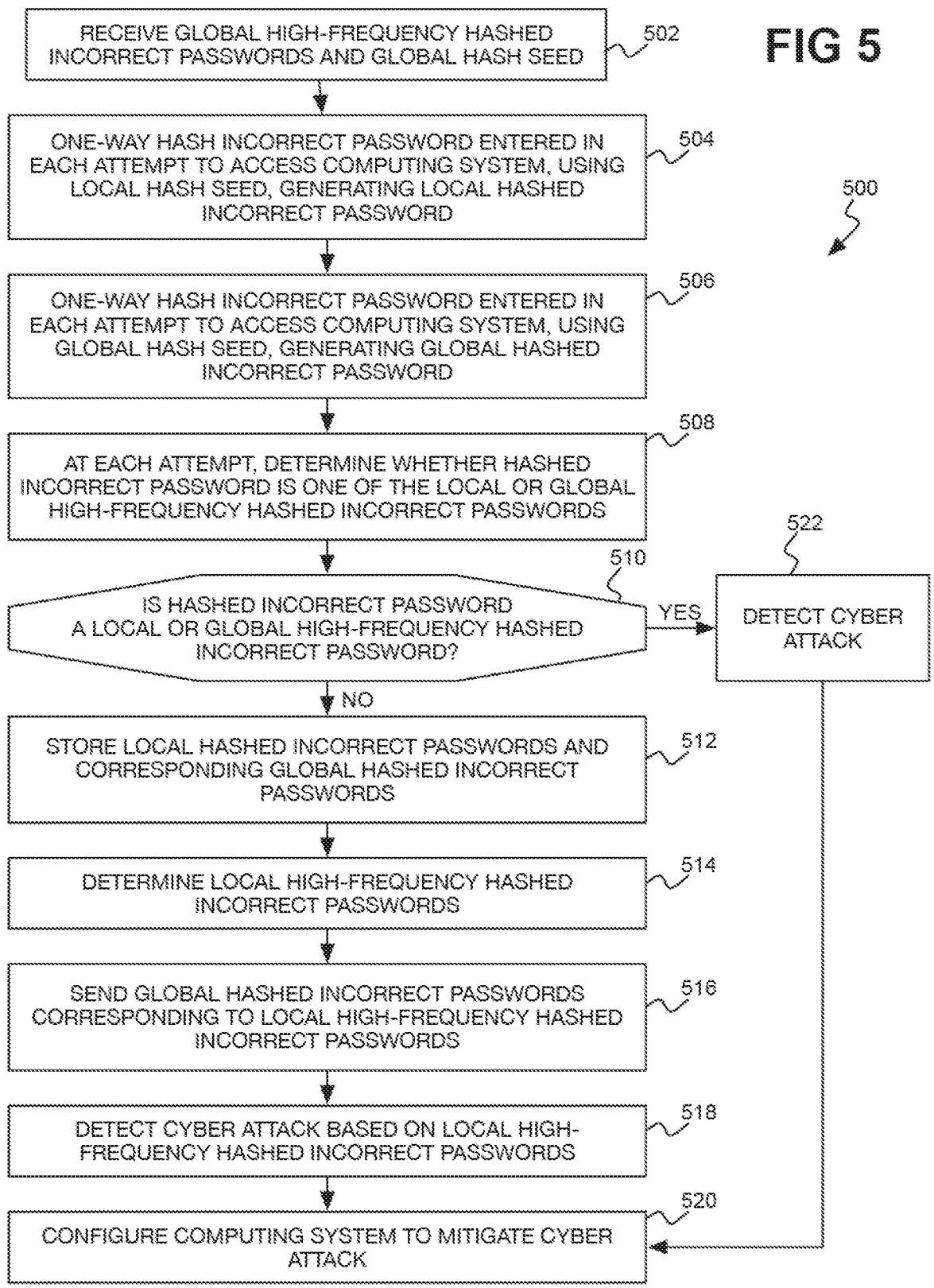
FIG. 5 is a flowchart of an example method for detecting cyber attacks based on high-frequency hashed incorrect passwords entered at a computing system, consistent with FIGS. 1 and 2, and in which the computing system interacts with a central attack-monitoring service and employs both a local hash seed and a global hash seed.

FIG. 5 shows another example method 500 for detecting cyber attacks based on high-frequency hashed incorrect passwords. The method 500 is consistent with but more detailed than the process of FIG. 1, and like the method 300 of FIG. 3, can be combined with the method 200 of FIG. 2. The method 500 may further be used in conjunction with the method 300. The method 500 may be performed by a computing system, and may be implemented as program code stored on a non-transitory computer-readable data storage medium, such as the program code 102 stored on the computer-readable data storage medium 100 of FIG. 1.

The example method 500 is similar to the method 300 of FIG. 3 in that the method 500 uses a one-way hashing algorithm or function that inputs a hash seed as well as an incorrect password, and thus generates a one-way hash of the incorrect password using the input hash seed. In the method 500, however, there are two hash seeds: a local hash seed and a global hash seed. In an implementation in which the method 500 is combined with the method 300, either or both of the local hash seed and the global hash seed can change over successive time periods. In the case in which the local hash seed periodically changes, the computing system at which the method 500 is performed changes the local hash seed as described in relation to the method 300. In the case in which the global hash seed periodically changes, a central attack-monitoring service can change the global hash seed, as described in detail later in the detailed description.

The local hash seed is specific to the computing system in relation to which the method 500 is being performed. The global hash seed is common across a number of computing systems (including the computing system in relation to which the method 500 is being performed) that report their high-frequency hashed incorrect passwords to a central attack-monitoring service. FIG. 5 shows usage of a global hash seed from the perspective of a computing system at which incorrect passwords are entered in attempts to access the computing system, and that interacts with such a central attack-monitoring service. Usage of a global hash seed from the perspective of the central attack-monitoring service is described later in the detailed description.

The computing system receives global high-frequency hashed incorrect passwords from the central attack-monitoring service, as well as the global hash seed used to generate the hashes (502). The global high-frequency hashed incorrect passwords are one-way hashes of global high-frequency incorrect passwords that have been hashed with the global hash seed. Each global high-frequency hashed incorrect password corresponds to a high-frequency incorrect password that was entered more than a threshold number of attempts at computing systems that report to the central attack-monitoring service, regardless of the user-name for which the password was entered at any attempt.

The central attack-monitoring service may determine such a high-frequency hashed incorrect password as corresponding to an incorrect password entered with high frequency at any computing system that reports to the central attack-monitoring service. The central attack-monitoring service may determine such a high-frequency hashed incorrect password as corresponding to an incorrect password entered with high frequency at more than one computing system (or other threshold number of computing systems) that reports to the central attack-monitoring service. In either case, the global high-frequency hashed incorrect passwords may not correspond to incorrect passwords that have been entered with high frequency at the computing system at which the method 500 is being performed. The global high-frequency hashed incorrect passwords are thus additional high-frequency hashed incorrect passwords (besides the local high-frequency hashed incorrect passwords corresponding to incorrect passwords entered at the computing system at which the method 500 is being performed) that can be used to determine if the computing system is being subjected to a cyber attack.

The computing system one-way hashes the incorrect password entered at each unsuccessful attempt to access the computing system using the local hash seed that is specific to the computing system (504). The result of part 504 is a local hashed incorrect password. The computing system also one-way hashes the incorrect password entered at each unsuccessful access attempt using the global hash seed (506). The result of part 506 is a global hashed incorrect password. The global hash seed may be provided by the central attack-monitoring service, and if the method 500 is performed in conjunction with the method 300 of FIG. 3, can periodically change (such that the computing system periodically receives the updated global hash seed). As a result of parts 504 and 506, there are thus two one-way hashes generated for the incorrect password entered at each unsuccessful access attempt: a local one-way hash of the incorrect password and a global one-way hash of the incorrect password.

At each attempt, the computing system determines whether the hashed incorrect password is one of the local or global high-frequency hashed incorrect passwords (508). That is, the computing system compares the global hashed incorrect password of part 504 to the global high-frequency hashed incorrect passwords received in part 502, to determine if the global hashed incorrect password is present within the received list of global high-frequency incorrect passwords. The computing system also compares the local hashed incorrect password of part 506 to local high-frequency hashed incorrect passwords that the computing system itself determines based on hashed incorrect passwords corresponding to passwords entered with high frequency during prior unsuccessful access attempts at the computing system itself. The computing system thus determines if the local hashed incorrect password is present within the local high-frequency hashed incorrect passwords that the computing system has determined.

In the example of FIG. 5, at any unsuccessful attempt, if the global or local hash of the incorrect password entered at the attempt is respectively such a global or local high-frequency hashed incorrect password (510), then the computing system detects that a cyber attack is occurring (522). Like parts 206 and 216 of the method 200 of FIG. 2, then, parts 510 and 522 of the method 500 detect a cyber attack responsive to an incorrect password entered at the computing system that corresponds to an incorrect password entered at the computing system itself in previous access attempts with high frequency. However, parts 510 and 522 also detect a cyber attack responsive to an incorrect password being entered at the computing system that corresponds to an incorrect password entered at one or more other computing systems in previous access attempts with high frequency.

The computing system stores the local hashed incorrect passwords and the corresponding global hashed incorrect passwords within a database (512). For each unsuccessful access attempt, the computing system thus stores the local hash of the incorrect password used in the unsuccessful access attempt, where this one-way hash was determined using the local hash seed. The computing system can also store the global hash of the incorrect password used in the unsuccessful access attempt, where this one-way hash was determined using the global hash seed.

The computing system determines local high-frequency hashed incorrect passwords (514), from the hashed incorrect passwords that the computing system stored in part 512 (i.e., from the one-way local hashes of incorrect passwords entered during unsuccessful access attempts of the computing system). Part 514 can be performed as has been described above in relation to part 108 of FIG. 1. The computing system sends to the central attack-monitoring service the global hashed incorrect passwords corresponding to the local high-frequency hashed incorrect passwords that have been determined (516). The central attack-monitoring service may analyze these high-frequency hashed incorrect passwords along with those received from other computing systems, as is described in more detail later in the detailed description. The computing system may periodically remove (i.e., delete) the global hashed incorrect passwords (i.e., the one-way hashes generated using the global hash seed) from the database, once they have been sent to the central attack-monitoring service.

The computing system detects a cyber attack based on the (local) high-frequency hashed incorrect passwords that the computing system has determined in part 504 (518). Part 518 can be performed as has been described above in relation to part 110 of FIG. 1. Responsive to a cyber attack having been detected in part 522 or 518, the computing system can be configured to mitigate the cyber attack (520), as has been described above in relation to part 214 of the method 200 of FIG. 2.

In the example method 500, cyber attacks are thus detected in three ways. First, at each attempt in which an incorrect password is entered at the computing system, if the incorrect password corresponds to a password previously entered with high frequency during prior unsuccessful access attempts at the computing system, then a cyber attack is detected. This is achieved by generating a one-way hash of the incorrect password using the local hash seed in part 504, and comparing the resulting local hashed incorrect password to the local high-frequency hashed incorrect passwords that the computing system has already determined in part 508. This is similar to parts 202 and 204 of the method 200 of FIG. 2.

Second, in the example method 500, unlike in the method 200, at each attempt in which an incorrect password is entered at the computing system, if the incorrect password corresponds to an incorrect password previously entered with high frequency during prior unsuccessful attempts at one or more other computing systems, then a cyber attack is also detected. This is achieved by generating a one-way hash of the incorrect password using the global hash seed in part 506, and comparing the resulting global hashed incorrect password to the global high-frequency hashed incorrect passwords in part 508, as received from the central attack-monitoring service in part 520. Therefore, as incorrect passwords are entered at the computing system, the computing system checks both a local hash and a global hash of each password against respective local and global high-frequency hashed incorrect passwords to detect a cyber attack.

Third, the method 500 also detects a cyber attack by at least periodically determining the incorrect passwords entered at the computing system with high frequency over unsuccessful access attempts, per parts 514 and 518. This is similar to parts 210 and 212 of the method 200 of FIG. 2. The utilization of global high-frequency hashed incorrect passwords, in addition to local high-frequency hashed incorrect passwords, therefore permits the method 500 to detect cyber attacks in more ways than if just local high-frequency hashed incorrect passwords were considered.

Figure 6:
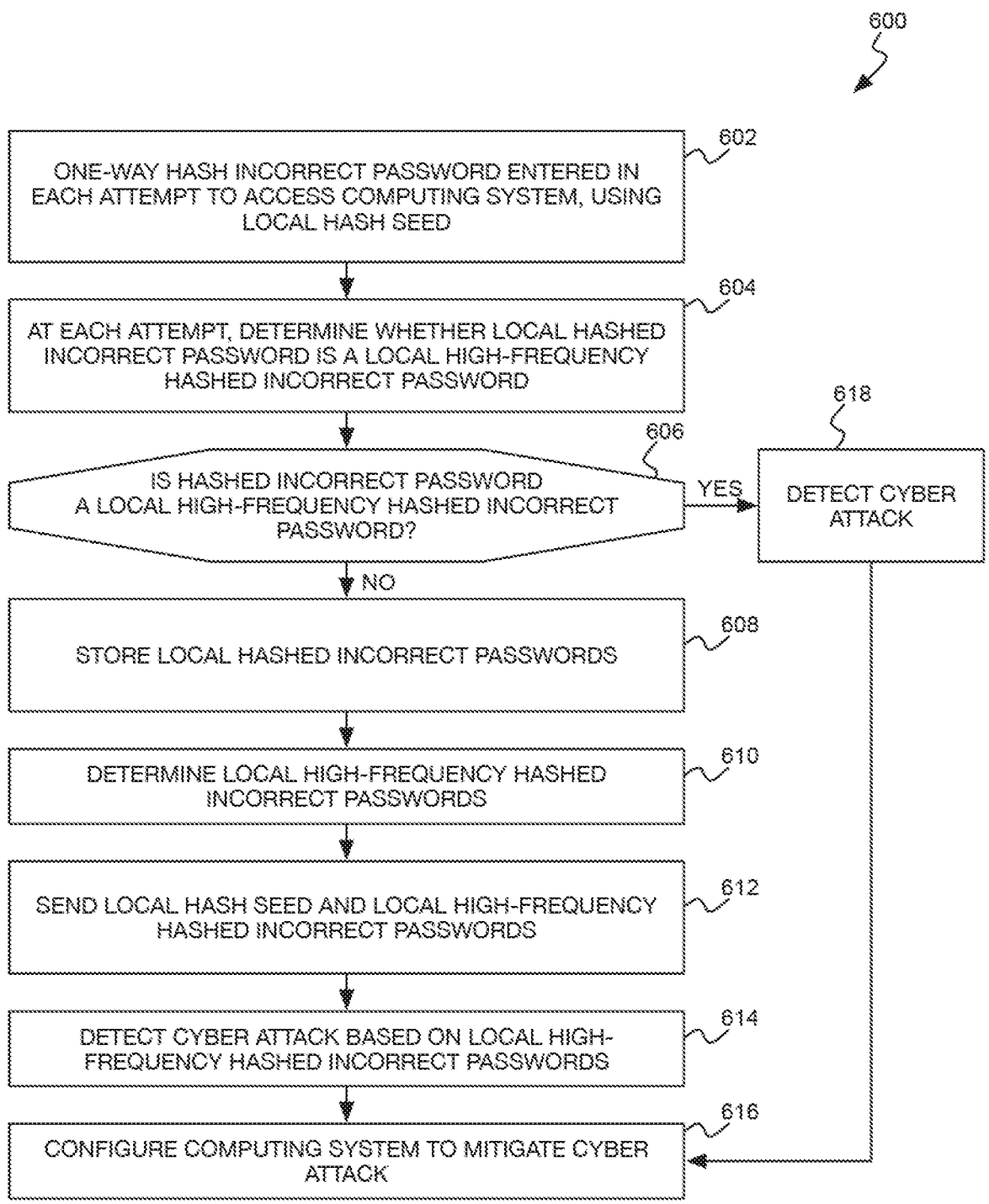
FIG. 6 is a flowchart of an example method for detecting cyber attacks based on high-frequency hashed incorrect passwords entered at a computing system, consistent with FIGS. 1 and 2, and in which the computing system interacts with a central attack-monitoring service and employs (just) a local hash seed.

FIG. 6 shows another example method 600 for detecting cyber attacks based on high-frequency incorrect passwords. The method 600 is consistent with but more detailed than the process of FIG. 1, and like the methods 300 and 500 of FIGS. 3 and 5, can be combined with the method 200 of FIG. 2. The method 600 may further be used in conjunction with the method 300. The method 600 may be performed by a computing system, and may be implemented as program code stored on a non-transitory computer-readable data storage medium, such as the program code 102 stored on the computer-readable data storage medium 100 of FIG. 1.

The example method 600 is similar to the method 500 of FIG. 5 in that the method 600 interacts with a central attack-monitoring service. In the method 600, however, just a local hash seed is used, not a global hash seed in addition to a local hash seed, when one-way hashing incorrect passwords entered at the computing system during unsuccessful access attempts. Although the computing system may in the method 600 send the local hash seed that it used to generate high-frequency hashed incorrect passwords (i.e., hashes of high-frequency incorrect passwords), the central attack-monitoring service is unable to compare the high-frequency hashed incorrect passwords received from the computing system to those received from other computing systems.

This is because the computing systems generate their high-frequency hashed incorrect passwords using different local hash seeds. For instance, the computing system performing the method 600 uses a different local hash seed than other computing systems that interact with the central attack-monitoring service. Therefore, even if the same incorrect password is entered at different computing systems, the corresponding hash that each computing system generates from this same password is different. The central attack-monitoring service also cannot reverse the hashes received from different computing systems to determine commonality of the entered incorrect passwords across the computing systems, since the hashes are one-way hashes.

As such, in the example method 600, unlike in the method 500 of FIG. 5, the computing system does not receive a list of global high-frequency hashed passwords from the central attack-monitoring service. The central attack-monitoring service cannot generate such a list from the high-frequency hashed incorrect passwords received from the computing systems that interact with the service, when such hashes are generated using local hash seeds that differ over the computing systems. Finally, it is noted that, like the method 500, the method 600 can be combined with the method 300, such that the local hash seed described in the method 600 can periodically change per the method 300.

In the method 600, then, the incorrect password entered in each unsuccessful attempt to access the computing system is one-way hashed using a local hash seed specific to the computing system (602), as in part 202 of the method 200 of FIG. 2. At each attempt, the computing system determines whether the local hashed incorrect password is a local high-frequency hashed incorrect password (604), as in part 204 of the method 200. If the local hashed incorrect password is a local high-frequency hashed incorrect password (606), then the computing system detects a cyber attack (618), as in parts 206 and 216 of the method 200.

The computing system also stores the hashed incorrect passwords within a database (608), and determines local high-frequency hashed incorrect passwords from these stored passwords (610), as has been described above in relation to parts 108 and 210 of FIGS. 1 and 2, respectively. In the example method 600, then, the computing system generates one-way hashes of incorrect passwords entered during unsuccessful access attempts of the computing system itself, using a local hash seed specific to this computing system. The computing system then determines high-frequency hashed incorrect passwords from these one-way hashes of incorrect passwords.

Unlike as in the method 200 of FIG. 2, the computing system in the example method 600 sends the local high-frequency hashed incorrect passwords that the system has determined to a central attack-monitoring service (612). The computing system may send the local hash seed that the system used to generate these one-way hashes to the central attack-monitoring service in part 612 as well. How the central attack-monitoring service uses the local high-frequency hashed incorrect passwords received from the computing system, as well as those received from other computing systems, is describe later in the detailed description.

The computing system can determine whether a cyber attack is occurring based on the high-frequency hashed incorrect passwords that have been determined (614). Part 614 can be performed as described above in relation to parts 110 and 212 of FIGS. 1 and 2, respectively. Responsive a cyber attack having been detected in part 614 or 618, the computing system can be configured to mitigate the cyber attack (616), as has been described in relation to part 214 of the method 200.

Figure 7:
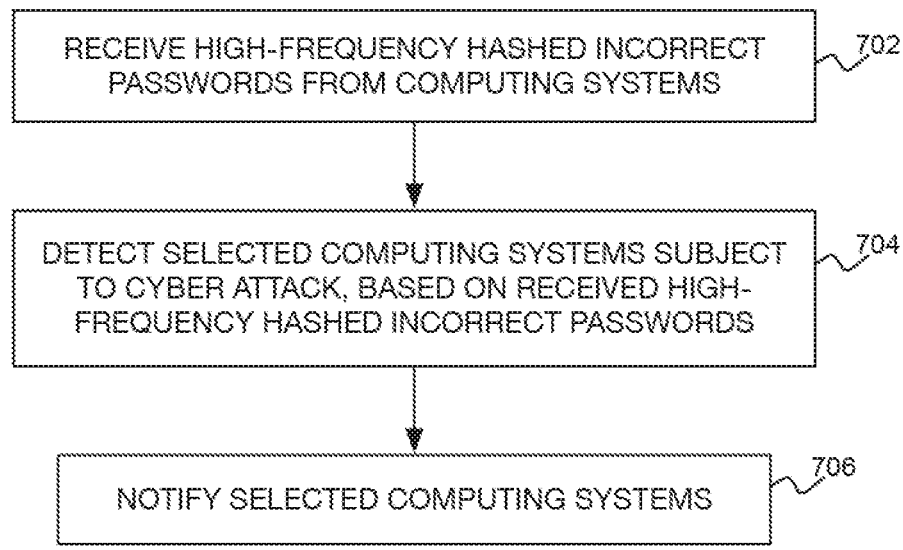
FIG. 7 is a flowchart of another example method for detecting, at a central attack-monitoring service, cyber attacks based on high-frequency hashed incorrect passwords entered at different computing systems.

FIG. 7 shows another example method 700 for detecting cyber attacks from high-frequency hashed incorrect passwords. Whereas the processes and methods of FIGS. 1-6 that have been described pertain to a computing system at which incorrect passwords are entered during unsuccessful access attempts of the computing system, the method 700 pertains to a central attack-monitoring service that receives high-frequency incorrect password hashes from multiple such computing systems. The central attack-monitoring service can be the service with which a computing system interacts when performing the method 500 of FIG. 5 or the method 600 of FIG. 6.

The method 700 is thus performed by a central attack-monitoring service that monitors multiple computing systems. The central attack-monitoring service may be embodied within one or more server computing devices that are communicatively connected with the computing systems over a network like the Internet. The method 700 may be implemented as program code stored on a non-transitory computer-readable data storage medium and that is executed by such server computing devices to realize the central attack-monitoring service, which can be therefore considered a combination of both hardware and software in this respect.

The central attack-monitoring service receives high-frequency one-way hashed incorrect passwords from the computing systems (702). The high-frequency hashed incorrect passwords received from a given computing system correspond to incorrect passwords that were each entered more than a threshold number of attempts to access the computing system in question, regardless of the username for which the incorrect password was entered in any attempt. The high-frequency hashed incorrect passwords may be those sent by such a computing system in part 516 of the method 500 of FIG. 5 or in part 612 of the method 600 of FIG. 6.

The central attack-monitoring service detects that selected computing systems of the systems that the service monitors are subject to (i.e., are currently being subjected to or are at risk of being subjected to) a cyber attack, based on the high-frequency one-way hashed incorrect passwords received from the computing systems (704). The manner by which the central attack-monitoring service detects which computing systems are subject to a cyber attack can differ based on whether the high-frequency hashed incorrect passwords received from the computing systems were generated using different local hash seeds that are each specific to a computing system or using the same global hash seed common to the computing systems. Such different detection approaches are described later in the detailed description in reference to FIGS. 8 and 9.

However, the central attack-monitoring service can detect that selected computing systems are subject to a cyber attack even if high-frequency one-way hashed incorrect passwords were not recently received from these computing systems. The computing systems may be operated by entities of varying types, such as entities of particular industries, including banking, legal, manufacturing, technology, and so on. The entities may be classified according to whether they are governmental entities, business entities, or other types of entities. The entities may be classified according to the geographical locations in which their computing systems operate. The entities can be grouped in other ways as well.

Therefore, a central attack-monitoring service can discern commonalities among the computing systems from which high-frequency hashed incorrect passwords were received to determine whether entities of a particular type are subject to a cyber attack. For example, the central attack-monitoring service may detect that there has been a spike in high-frequency hashed incorrect passwords being entered at computing systems operated by entities within a particular industry. The selected computing systems subject to a cyber attack can thus include those computing systems operated by entities within the industry in question, even if such a computing system has not recently experienced entry of high-frequency incorrect passwords during unsuccessful access attempts of the computing system. The computing system may be at risk of a cyber attack, in other words, because it is operated by an entity within a given industry in which other entities have experienced unsuccessful access attempts of their computing systems with high-frequency incorrect passwords.

The central attack-monitoring service notifies the selected computing systems that the service has determined are being subjected to or are at risk of a cyber attack (706). The selected computing systems can be responsively configured to mitigate the cyber attack upon receiving this notification, as has been described in relation to part 214 of FIG. 2. If a selected computing system is a computing system from which the central attack-monitoring service recently received high-frequency hashed incorrect passwords, the selected computing system may have already determined that it is being subjected to a cyber attack. However, the additional notification can indicate to the computing system that the cyber attack is an industry-wide cyber attack, and that the system is not necessarily the exclusive target of the attack. The computing system may not have appreciated the full severity of the cyber attack, for instance, such that the additional notification received form the central attack-monitoring service may serve to indicate that the attack is more serious than was initially assessed at the computing system.

Furthermore, if a selected computing system is a computing system from which the central attack-monitoring service has not recently received high-frequency hashed incorrect passwords, then the notification received from the central attack-monitoring service can act as an early warning that the computing system may soon be subjected to the cyber attack. For example, the selected computing system may be operated by an entity in the banking sector. The computing systems of other entities in the banking sector may already be subjected to a cyber attack, as evidenced by incorrect passwords entered at high frequency during unsuccessful access attempts of these computing systems. Therefore, the selected computing system may be configured to mitigate a cyber attack that has not yet occurred, but that may likely occur in the near future.

The entities operating the computing system may more likely be receptive to furnishing their high-frequency hashed incorrect passwords to the central attack-monitoring service, which may be provided by an operator having the entities as customers. This is because the entities do not provide the incorrect passwords that were actually entered with high frequency at their computing systems, but rather provide one-way hashes of the incorrect passwords that prevent the actual passwords from being identified from the hashes. Furthermore, the computing systems may not provide other information to the central attack-monitoring service, such as the hashed usernames that the computing systems store in part 208 of FIG. 2. The computing systems may provide just high-frequency incorrect passwords to the central attack-monitoring service, for instance, or if additional information is also provided, the computing systems may first anonymize this information before sending it to the central attack-monitoring service.

Figure 8:
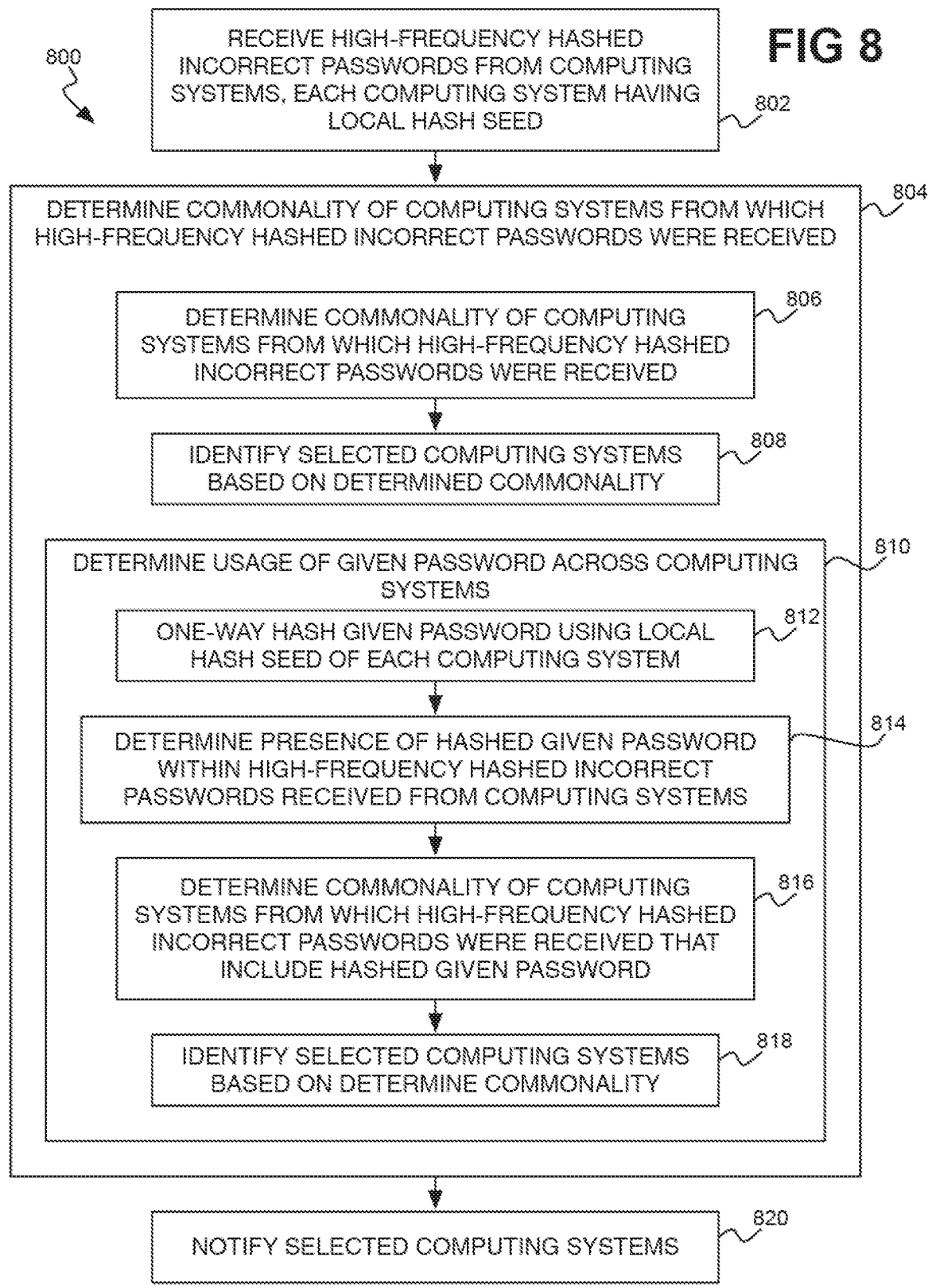
FIG. 8 is a flowchart of an example method for detecting, at a central attack-monitoring service, cyber attacks based on high-frequency hashed incorrect passwords entered at different computing systems, consistent with FIG. 7, and in which the hash seeds used to generate hashes are local hash seeds specific to the different computing systems.

FIG. 8 shows another example method 800 for detecting cyber attacks based on high-frequency hashed incorrect passwords. The method 800 is consistent with but more detailed than the method 700 of FIG. 7. The method 800 may thus be performed by a central attack-monitoring service. The method 800 may, like the method 700, be implemented as program code stored on a non-transitory computer-readable data storage medium.

In the example method 800, the high-frequency hashed incorrect passwords received from the computing systems are one-way hashes that the computing systems generate from high-frequency incorrect passwords entered during unsuccessful access attempts using local hash seeds that are each specific to a corresponding computing system. The example method 800 can thus be performed by the central attack-monitoring service in conjunction with the computing systems each performing the method 600 of FIG. 6 that has been described. The local hash seed used at any given computing system may further periodically change over time, per the method 300 of FIG. 3.

The central attack-monitoring service receives the high-frequency hashed incorrect passwords from the computing systems (802). The high-frequency hashed incorrect passwords received from a computing system are one-way hashes generated using a local hash seed specific to the computing system. The central attack-monitoring service may also receive from each computing system the local hash seed used to generate the high-frequency hashed incorrect passwords in question, either with the one-way hashes or at another time, such as each time the computing system changes the local hash seed that the system is using.

The central attack-monitoring service detects selected computing systems that are subject to a cyber attack based on the received high-frequency hashed incorrect passwords (804). In the example method 800, the central attack-monitoring service cannot discern commonalities across the one-way hashes received from different computing systems, since the computing systems use different local hash seeds when computing the hashes, and since the hashes are not reversible to determine the passwords from which they were generated. That is, even if a given password is entered with high frequency in unsuccessful attempts at more than one computing system, the corresponding one-way hash that the central attack-monitoring service receives from each such system will differ because each system used a different local hash seed when generating the hash. Therefore, the central attack-monitoring service cannot determine that a one-way hash received from one computing system corresponds to the same incorrect password to which a one-way hash received from another computing system does.

In one implementation, the central attack-monitoring service may detect the selected computing systems that are subject to a cyber attack in part 804 by performing parts 806 and 808. Specifically, the central attack-monitoring service can determine the commonality of the computing systems from which high-frequency hashed incorrect passwords were received (806), regardless of what these received actual one-way hashes are. That is, the central attack-monitoring service does not analyze the high-frequency hashed incorrect passwords received from one computing system vis-à-vis the high-frequency hashed incorrect passwords received from any other computing system. Rather, the central attack-monitoring service considers from which computing systems high-frequency hashed incorrect passwords were recently received, and identifies commonalities among these computing systems.

For example, the central attack-monitoring service may discern that the commonality of the computing systems from which high-frequency hashed incorrect passwords were received is that the vast majority are concentrated in a given geographical area. As another example, the central attack-monitoring service may discern that the commonality of the computing systems from which one-way hashes were received is that they are operated by governmental organizations of a similar type although of different sovereign states. As a third example, the central attack-monitoring service may discern that the commonality of the computing systems from which high-frequency hashed incorrect passwords were received is that they are located within the same geographical area and operated by entities in the same industry.

The central attack-monitoring service can identify selected computing systems based on this determined commonality (808). Other computing systems from which the central attack-monitoring service has not recently received high-frequency hashed incorrect passwords, but which share this commonality of computing systems from which the service did recently receive high-frequency hashed incorrect passwords, are therefore identified as selected computing systems, too. As noted above, in other words, the selected computing systems can include computing systems from which high-frequency incorrect hashed incorrect passwords have not been (recently) received.

In the same or different implementation, the central attack-monitoring service may detect the selected computing systems that are subject to a cyber attack in part 804 by performing part 810. The central attack-monitoring service specifically determines the high-frequency usage of a given password across computing systems (810). To perform part 810, the central attack-monitoring service has to have received the local hash seeds with which the computing systems generated the high-frequency hashed incorrect passwords that the systems sent to the service.

The central attack-monitoring service may perform such analysis in relation to the given password when such a password has come to the attention of the service. For example, the entity operating a computing system may note that a specific password is being inordinately used in unsuccessful access attempts and accordingly notify the central attack-monitoring service. As another example, the central attack-monitoring service may have recently received a list of passwords that a particular hacker or other nefarious party is planning to use or has used, and may want to determine if the computing systems of its subscribers have been subjected to cyber attack with any password on this list.

The central attack-monitoring service thus one-way hashes the given password using the local hash seed of each computing system (812). Therefore, the central attack-monitoring service generates a number of one-way hashes that may be equal to the number of computing systems that the service monitors. For each local hash seed, the central attack-monitoring service determines whether the corresponding hashed given password is present within the high-frequency hashed incorrect passwords received from the computing system to which the local hash seed corresponds (814). Because the local hash seeds are different, the one-way hash that the central attack-monitoring service looks up in the high-frequency hashed incorrect passwords received from a computing system differs from the hash that the service looks up in the one-way hashes received from another computing system, even though both hashes correspond to the same password.

The central attack-monitoring service determines the commonality of the computing systems from which high-frequency hashed incorrect passwords were received that include the hashed given password (816). That is, the central attack-monitoring service determines the commonality of each computing system from which one-way hashes were received that include a one-way hash of the given password generated using the local hash speed specific to that system. Such commonality can be determined in part 816 similar to the manner in which commonality is determined in part 806. The central attack-monitoring service then identifies selected computing systems based on this determined commonality (818), such as has been described in relation to part 808.

Once the central attack-monitoring service has determined selected computing systems that are being subjected to or that are risk of a cyber attack, the service notifies the selected computing systems (820), as in part 706 of FIG. 2. The selected computing systems can then perform actions to mitigate the cyber attack, as described above in part 214 of FIG. 2. The example method 700 thus pertains to detection of a cyber attack by a central attack-monitoring service based on high-frequency hashed incorrect passwords received from computing systems and that were hashed using different local hash seeds particular to the systems.

Figure 9:
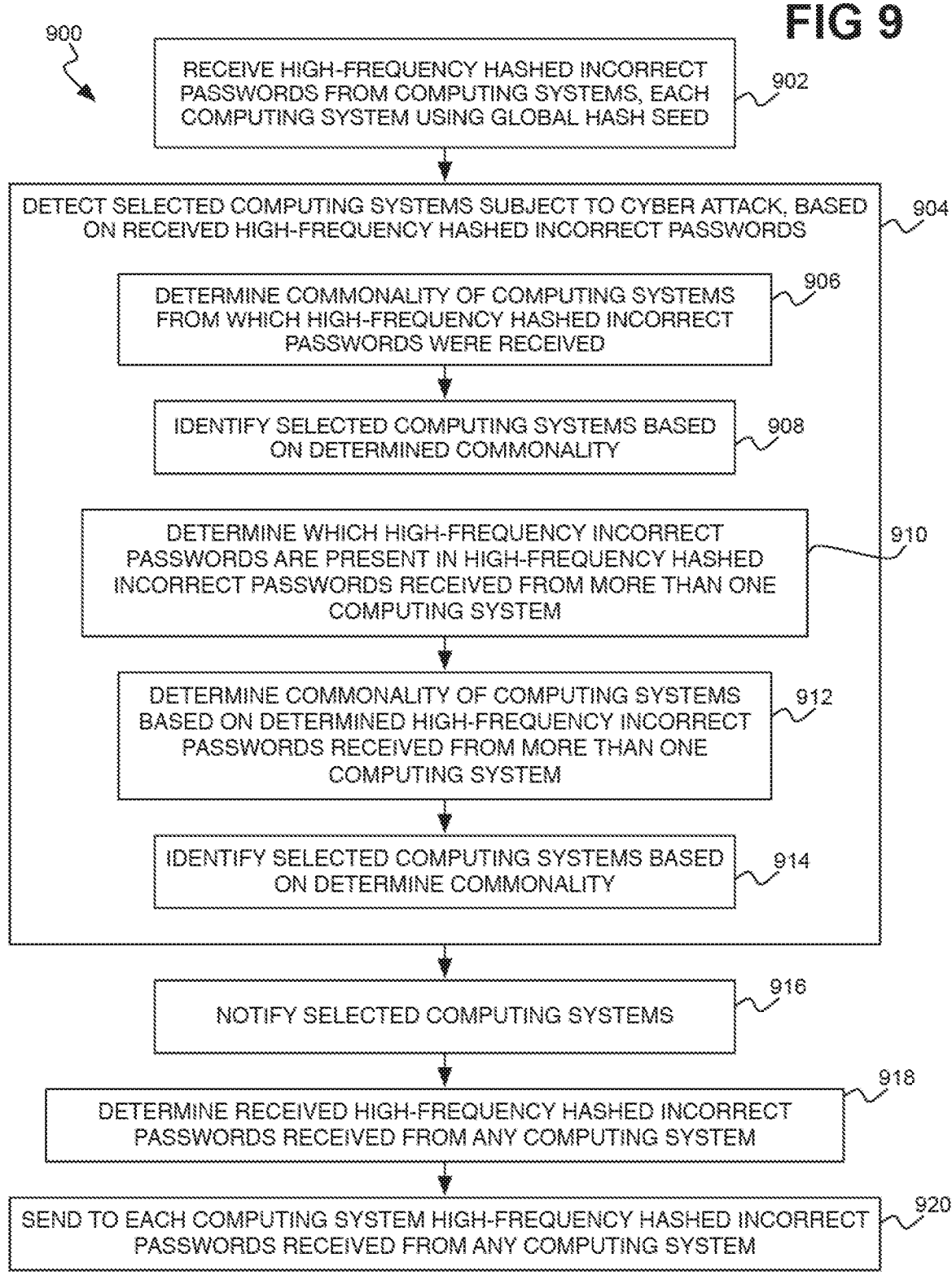
FIG. 9 is a flowchart of an example method for detecting, at a central-attack monitoring service, cyber attacks based on high-frequency hashed incorrect passwords entered at different computing systems, consistent with FIG. 7, and in which the hash seed used to generate the hashes is a global hash seed common across different computing systems.

FIG. 9 shows another example method 900 for detecting cyber attacks based on high-frequency hashed incorrect passwords. The method 900 is consistent with but more detailed than the method 700 of FIG. 7. The method 900, like the method 800 of FIG. 8, may be performed by a central attack-monitoring service, and may be implemented as program code stored on a non-transitory computer-readable data storage medium.

In the example method 900, the high-frequency hashed incorrect passwords received from the computing systems are one-way hashes that the computing systems generate from high-frequency incorrect passwords entered during successful access attempts using a common global seed. The example method 900 can thus be performed by the central attack-monitoring service in conjunction with the computing systems each performing the method 500 of FIG. 5 that has been described. The global hash seed may further periodically change over time, similar to the periodic changing of a local hash seed in the method 300 of FIG. 3. In such an implementation, the central attack-monitoring service can itself periodically change the global hash seed and send the updated hash seed to each computing system.

The central attack-monitoring service receives the high-frequency hashed incorrect passwords from the computing systems (902), which were generated at each computing system using the same global hash seed. The central attack-monitoring service can detect selected computing systems subject to cyber attack based on these received high-frequency hashed incorrect passwords (904). Unlike in the method 800 of FIG. 8, because the hashed incorrect passwords received from each computing system in the method 900 are generated using the same global hash seed, the central attack-monitoring service can compare the one-way hashes received from one computing system directly to the hashes received from the other computing systems.

However, the central attack-monitoring service can also detect the selected computing systems in the same way in which the service detects the selected computing systems when the hashed incorrect passwords received from different computing systems are hashed using different local hash seeds, as in the method 800 of FIG. 8. Such detection can occur by performing parts 906 and 908. The central attack-monitoring service determines the commonality of the computing systems from which high-frequency hashed incorrect passwords were received (906), and then identifies selected computing systems based on this determined commonality (908), as in parts 806 and 808 of FIG. 8.

Because the central attack-monitoring service can compare the one-way hashes received from one computing system directly to those received from other computing systems, though, the service can also detect the selected computing system in the method 900 in a way that it cannot in the method 800 of FIG. 8. Such detection can occur by performing parts 910, 912, and 914. The central attack-monitoring service determines which high-frequency incorrect passwords are common across the passwords received from more than one computing system (910). For instance, for each of the one-way hashes received from any computing system, the central attack-monitoring service can determine the number of computing systems from which the central attack-monitoring service received the hash in question. The central attack-monitoring service may identify the high-frequency incorrect passwords that were received from more than a threshold number of the computing systems.

The central attack-monitoring service determines the commonality of the computing systems based on these high-frequency incorrect passwords that were received from more than one of (e.g., more than a threshold number of) the computing systems (912). The central attack-monitoring service may determine this commonality as has been described in relation to part 806 of FIG. 8. The central attack-monitoring service then identifies selected computing systems based on this determined commonality (914), such as has been described in relation to part 808 of FIG. 8.

The central attack-monitoring service may thus detect the selected computing systems by performing parts 906 and 908, by performing parts 910, 912, and 914, and/or in another manner. Because the one-way hashes received from the selected computing systems are generated using the same global hash seed, the service is able to directly compare the received one-way hashes with one another in the method 900. Once the selected computing systems have been detected, the central attack-monitoring service can notify the selected computing systems (916), as in part 706 of FIG. 7, which can then mitigate the cyber attack as has been described.

The central attack-monitoring service may also assemble a list of received high-frequency hashed incorrect passwords received from any computing system (918). The service can determine this list as a union of the high-frequency hashed incorrect passwords received from the computing systems in part 902. Therefore, each one-way hash in the list is a hash received from at least one computing system in part 902. The central attack-monitoring service then sends this list of high-frequency hashed incorrect passwords to each computing system (920). A computing system performing the method 500 of FIG. 5, for instance, may receive this list in part 502, and test a global hash seed-generated hash of the incorrect password entered in any unsuccessful access attempt of the computing system against the list in part 508, as has been described.

Figure 10:
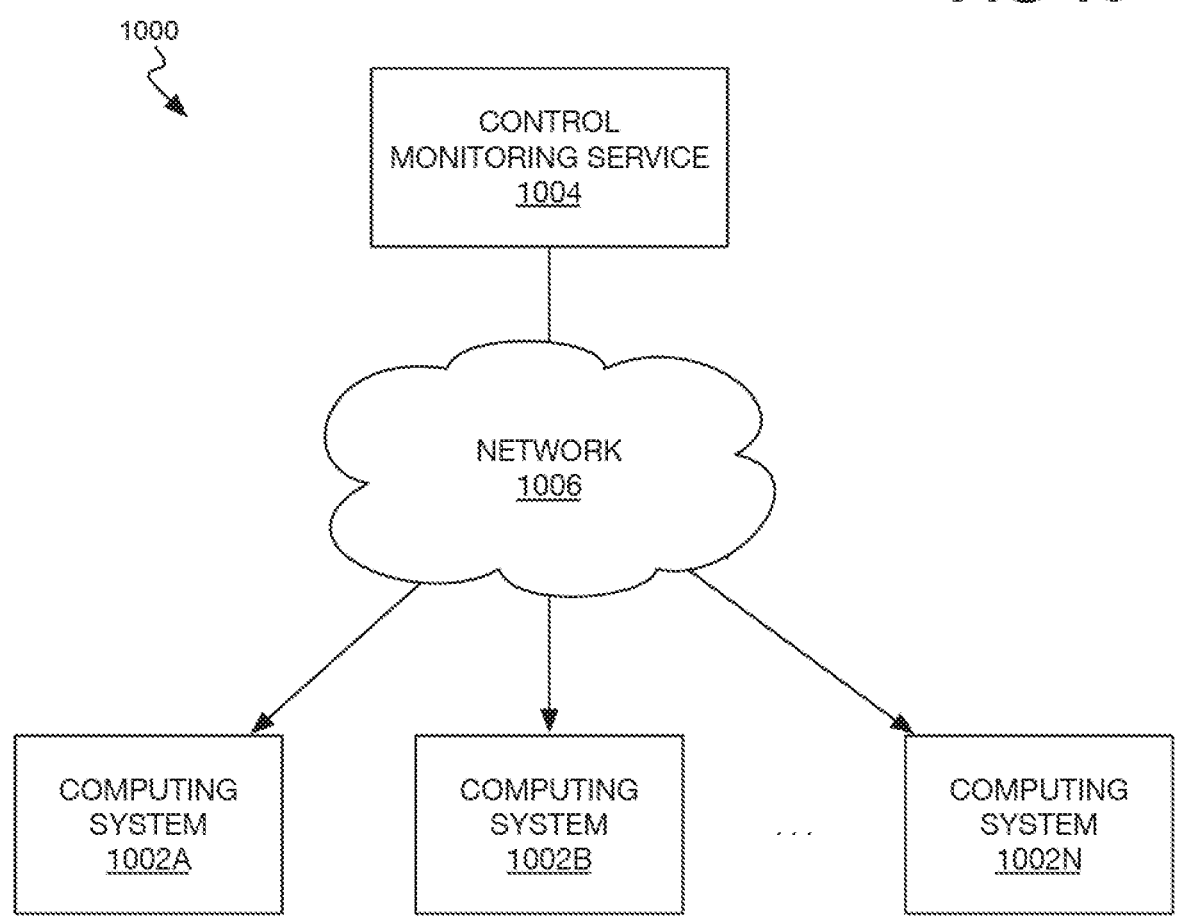
FIG. 10 is a diagram of an example system for detecting cyber attacks based on high-frequency hashed incorrect passwords entered at computing systems, which includes a central attack-monitoring service, and at which the processing and methods of FIGS. 1-9 can be performed.

FIG. 10 shows an example system 1000 within which the example processing and methods and that have been described in relation to FIGS. 1-9 can be performed. The system 1000 includes a number of computing systems 1002A, 1002B, . . . , 1002N, which are collectively referred to as the computing systems 1002. The system 1000 further includes a central attack-monitoring service 1004. The computing systems 1002 and the central attack-monitoring service 1004 are communicatively connected over a network 1006, which can include the Internet, for instance.

The computing systems 1002 can each perform the processing and methods of FIGS. 1-6 that have been described. The computing systems 1002 may be operated by different entities, such as different business organizations, governmental agencies, and so on. The entities may be unrelated to one another but for the entities being customers or clients of the provider of the central attack-monitoring service 1004 to which the computing systems 1002 send their high-frequency hashed incorrect passwords and from which the systems 1002 may receive notifications and global high-frequency hashed incorrect passwords.

The computing systems 1002 may not communicate directly with one another, and therefore may not directly share their high-frequency hashed incorrect passwords with each other. Rather, the computing systems 1002 send this information to the central attack-monitoring service 1004, which then can detect cyber attacks on the basis of these one-way hashes and correspondingly return cyber attack detection notifications, among other information. The central-attack monitoring service 1004 is implemented as a combination of hardware and software, and thus can include hardware, such as one or more server computing devices, in this respect.

The computing systems 1002 may be subject to cyber attack over the network 1006. For instance, unsuccessful access attempts of the computing systems 1002 that result from cyber attack may occur over the network 1006. The computing systems 1002 may further communicate with the central attack-monitoring service 1004 over this same network 1006. In another implementation, the network 1006 with which the computing systems 1002 and the central attack-monitoring service 1004 communicate is a different network that the network at which access of the computing systems 1002—including unsuccessful access attempts resulting from cyber attack—occurs.

Figure 11:
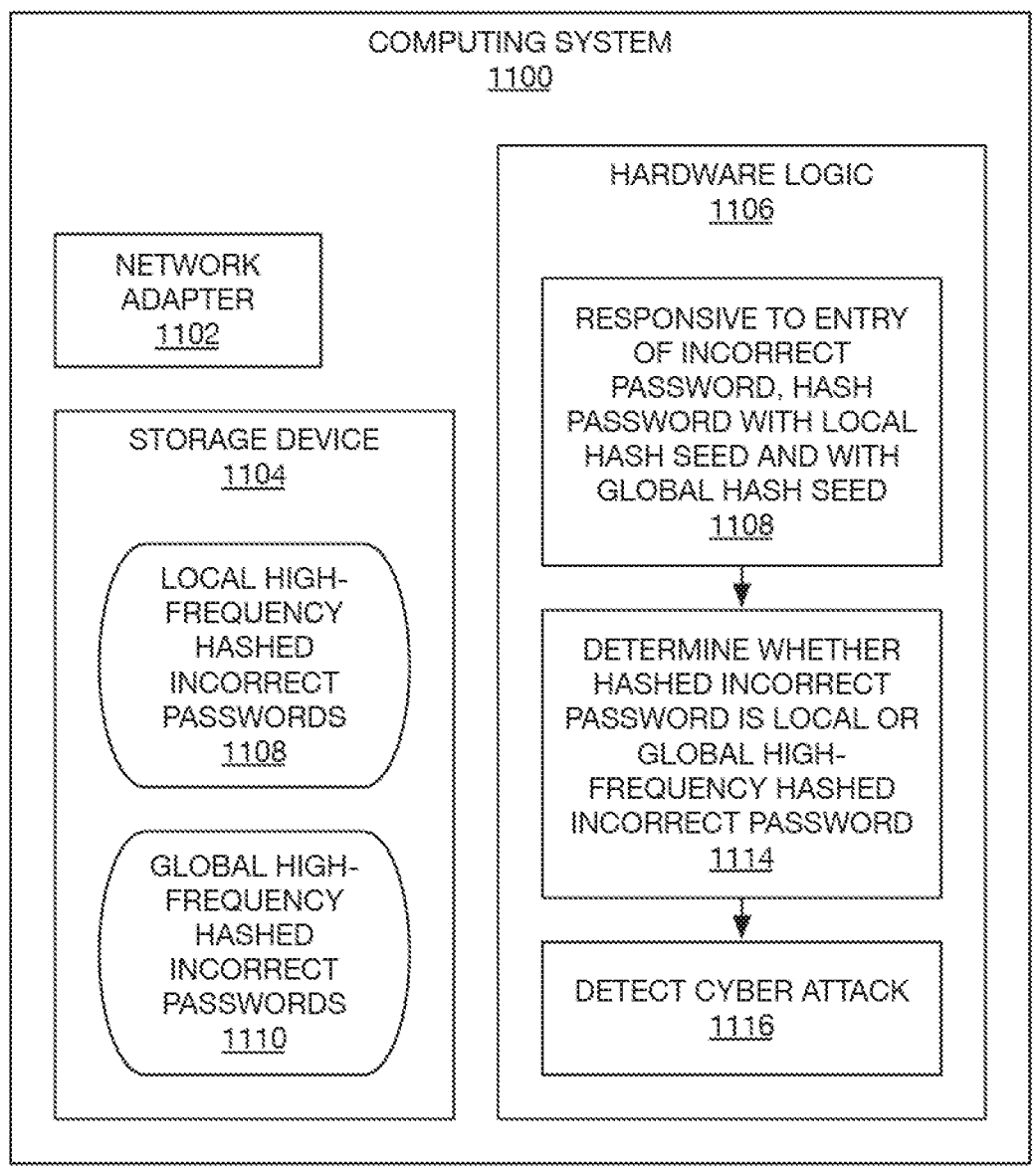
FIG. 11 is a diagram of an example computing system, such as one of the computing systems of FIG. 10, and which can perform the processing and methods of FIGS. 1-6.

FIG. 11 shows an example computing system 1100. The computing system 1100 can implement each of the computing systems 1002 of FIG. 10. The computing system 1100 is depicted in FIG. 11 as including a network adapter 1102, a storage device 1104, and hardware logic 1106. The computing system 1100 can include other hardware and software components, in addition to or in lieu of those depicted in FIG. 11.

The network adapter 1102 communicatively connects the computing system 1100 to a network, like the network 1006 of FIG. 10. The storage device 1104 can be a volatile or non-volatile storage device, such as a magnetic or semiconductor memory or other storage device. The storage device 1104 stores local high-frequency hashed incorrect passwords 1108 that were entered in unsuccessful access attempts of the system 1100, and which the computing system 1100 determines itself. The high-frequency hashed incorrect passwords 1108 can include those determined in parts 108 of FIG. 1, 210 of FIG. 2, 308 of FIG. 3, 514 of FIG. 5 and 610 of FIG. 6.

The local high-frequency hashed incorrect passwords 1108 may each correspond to an incorrect password entered for usernames in more than a threshold number of attempts to access the computing system 1100, regardless of the username for which the password was entered at any such attempt. Each such incorrect password may be one-way hashed using a local hash seed specific to the computing system 1100 and specific to a time period in which the incorrect password was entered in more than the threshold number of attempts. The resulting one-way hash of such an incorrect password is one of the local high-frequency hashed incorrect passwords 1108.

The storage device 1104 can also store global high-frequency hashed incorrect passwords 1110 that the computing system 1100 received from the central attack-monitoring service 1004 of FIG. 10. The global high-frequency hashed incorrect passwords 1110 can include those received in part 502 of FIG. 5. The global high-frequency hashed incorrect passwords 1110 can include those that the central attack-monitoring service 1004 determined in part 916 of FIG. 9 and sent to the computing system 1100 (and the other computing systems) in part 918 of FIG. 9.

The global high-frequency hashed incorrect passwords 1110 may each correspond to an incorrect password entered for usernames across the computing systems 1002 of FIG. 10 in more than a threshold number of attempts, regardless of the username for which the password entered at any such attempt. Each such incorrect password may be one-way hashed by the central attack-monitoring service 1004 of FIG. 10 using a global hash seed common to the computing systems 1002 and specific to a time period in which the incorrect password was entered in more than the threshold number of attempts. The resulting one-way hash of such an incorrect password is one of the global high-frequency hashed incorrect passwords 1110.

The hardware logic 1106 can embody program code that performs processing. The hardware logic 1106 can include an ASIC, a general-purpose processing, and/or a non-transitory computer-readable data storage medium, such as the computer-readable data storage medium 100 of FIG. 1. The processing that the hardware logic 1106 performs can include, responsive to the entry of an incorrect password for a username in an attempt to access the computing system 1100, one-way hash the incorrect password (1112).

Specifically, the incorrect password can be one-way hashed using local hash seeds specific to the computing system 1100 and that are each specific to a time period in which incorrect passwords were entered. Such local one-way hashing results in multiple local one-way hashes of the incorrect password, each corresponding to a different local hash seed. The local hash seeds are all specific to the computing system 1100, and are specific to different time periods.

The incorrect password can also be one-way hashed using global hash seeds common across the computing systems 1002 of FIG. 10 (including the computing system 1100) and that are each specific to a time period in which incorrect passwords were entered. Such global one-way hashing similarly results in multiple global one-way hashes of the incorrect password, each corresponding to a different global hash seed. The global hash seeds are common across the computing systems 1002, but are specific to different time periods.

The processing that the hardware logic 1106 performs can include determining whether any of the one-way hashes (i.e., any of the local and global hashed incorrect passwords) that have been determined in part 1112 for the entered incorrect password is a global or local high-frequency hashed incorrect password (1114). Specifically, for each local one-way hash, the hardware logic 1106 determines if the local one-way hash matches any local high-frequency hashed incorrect password 1108 corresponding to the same time period as the local one-way hash in question does. That is, the logic 1106 compares a given local one-way hash to the local high-frequency hashed incorrect passwords 1108 that were generated using the same local hash seed (specific to the same time period). A local one-way hash does not match a local high-frequency hashed incorrect password 1108 even if they are identical, if the hash was generated using a different hash seed, for a different time period, than the local high-frequency hashed incorrect password 1108 in question was.

Similarly, for each global one-way hash, the hardware logic 1106 determines if the global one-way hash matches any global high-frequency hashed incorrect password 1110 corresponding to the same time period as the global one-way hash in question does. That is, the logic 1106 compares a given global one-way hash to the global high-frequency hashed incorrect passwords 1110 that were generated using the same global hash seed (specific to the same time period). A global one-way hash does not match a global high-frequency hashed incorrect password 1110 even if they are identical, if the hash was generated using a different hash seed, for a different time period, than the global high-frequency hashed incorrect password 1110 in question was.

The processing that the hardware logic 1106 performs can include detecting a cyber attack based on whether any local one-way hash or any global one-way hash of the incorrect password is one of the local high-frequency hashed incorrect passwords 1108 or one of the high-frequency hashed incorrect passwords 1110 (1116). In the example computing system 1100, there are both local one-way hashes and global one-way hashes of incorrect passwords entered in unsuccessful access attempts of the system 1100. Furthermore, the local one-way hashes and global one-way hashes are themselves specific to different time periods, insofar as each local one-way hash of an incorrect password is generated using a local hash seed corresponding to a particular time period, and each global one-way hash of an incorrect password is generated using a global hash seed corresponding to a particular time period.

When an unsuccessful access attempt of the computing system 1100 is made in the example of FIG. 11, the incorrect password entered during this attempt can be hashed using multiple local hash seeds and multiple global hash seeds, and not just the local hash seed and the global hash seed for the time period of the unsuccessful access attempt. Rather, the incorrect password can be hashed using the local hash seeds and global hash seeds for prior time periods, too. This permits the computing system 1100 to determine whether the incorrect password was previously used with high frequency at any time period, including one or more prior time periods, whether locally or globally.

The techniques that have been described herein provide for detection of cyber attacks even when the cyber attacks occur slowly over relatively long periods of time. The described techniques can particularly determine if an incorrect password was used with high frequency during prior unsuccessful access attempts, regardless of the usernames for which the password was entered at any such unsuccessful attempt. By storing one-way hashes of the incorrect passwords within a database and not storing the passwords themselves within the database, impact of any potential security compromise of the database is lessened, and can lessen concerns with sharing such information with other entities indirectly through a central attack-monitoring service.

We claim:

1. A non-transitory computer-readable data storage medium storing program code executable by a processor to perform processing comprising:
   responsive to first incorrect passwords being entered for first usernames in first attempts to access a computing system during a first time period, one-way hashing each first incorrect password using a first hash seed;
   storing the hashed first incorrect passwords within a database;
   determining first high-frequency hashed incorrect passwords from the stored hashed first incorrect passwords, each first high-frequency hashed incorrect password corresponding to a first incorrect password that was entered more than a threshold number of the first attempts, regardless of the first username for which the first incorrect password was entered in any first attempt;
   detecting that the computing system is being subjected to a cyber attack based on the determined first high-frequency hashed incorrect passwords;
   responsive to second incorrect passwords being entered for second usernames in second attempts to access the computing system during a second period of time, one-way hashing each second incorrect password using a second hash seed different than the first hash seed; and
   storing the hashed second incorrect passwords within the database.

2. The non-transitory computer-readable data storage medium of claim 1, wherein the processing further comprises:
   responsive to detecting that the computing system is being subjected to the cyber attack, configuring the computing system to mitigate the cyber attack.

3. The non-transitory computer-readable data storage medium of claim 1, wherein the processing further comprises:
   responsive to the first incorrect passwords being entered for the first usernames, one-way hashing each first username for which an incorrect first password was entered; and
   storing, with the hashed first incorrect passwords, the hashed first usernames for which the first incorrect passwords were entered within the database,
   wherein the database permits determination of a number of first incorrect passwords that were entered for each hashed first username, and a number of first usernames for which each first incorrect password was entered.

4. The non-transitory computer-readable data storage medium of claim 3, wherein the processing further comprises:

responsive to the first incorrect passwords being entered for the first usernames, storing, with the hashed first incorrect passwords and the hashed first usernames, timestamps and network sources of the first attempts within the database.

5. The non-transitory computer-readable data storage medium of claim 1, wherein the processing further comprises:
  in response to an incorrect password being entered for a username in an attempt to access the computing system, one-way hashing the incorrect password;
  determining whether the hashed incorrect password is one of the first high-frequency hashed incorrect passwords, regardless of whether the first high-frequency hashed incorrect passwords were entered for the username; and
  in response to determining that the hashed incorrect password is one of the first high-frequency hashed incorrect passwords, detecting that the computing system is being subjected to the cyber attack.

6. The non-transitory computer-readable data storage medium of claim 5, wherein the processing further comprises:
  receiving high-frequency global hash seed-hashed incorrect passwords from a central attack-monitoring service monitoring a plurality of computing systems including the computing system, each high-frequency global hash seed-hashed incorrect password corresponding to an incorrect password one-way hashed using a global hash seed and that was entered more than the threshold number of attempts at the plurality of computing systems;
  in response to the incorrect password being entered for the username in the attempt to access the computing system, one-way hashing the incorrect password with the global hash seed;
  determining whether the global hash seed-hashed incorrect password is one of the received high-frequency global hash seed-hashed incorrect passwords, regardless of whether the high-frequency global hash seed-hashed incorrect passwords were entered for the username and regardless of whether the high-frequency global hash seed-hashed incorrect passwords were entered at the computing system; and
  in response to determining that the global hash seed-hashed incorrect password is one of the received high-frequency global hash seed-hashed incorrect passwords, detecting that the computing system is being subjected to the cyber attack.

7. The non-transitory computer-readable data storage medium of claim 1, wherein the processing further comprises:
  determining second high-frequency hashed incorrect passwords from the stored hashed second incorrect passwords, each second high-frequency hashed incorrect password corresponding to a second incorrect password that was entered more than the threshold number of the second attempts during the second period of time, regardless of the second username for which the incorrect password was entered in any attempt; and
  detecting that the computing system is being subjected to the cyber attack based on the determined second high-frequency hashed incorrect passwords.

8. The non-transitory computer-readable data storage medium of claim 1, wherein the processing further comprises:
  responsive to the first incorrect passwords being entered for the first usernames in the first attempts to access the computing system, one-way hashing each incorrect password using a global hash seed; and
  responsive to determining the first high-frequency hashed incorrect passwords, sending the global hash seed-hashed first incorrect passwords corresponding to the first high-frequency hashed incorrect passwords to a central attack-monitoring service monitoring a plurality of computing systems including the computing system.

9. The non-transitory computer-readable data storage medium of claim 8, wherein the processing further comprises:
  storing, with the hashed first incorrect passwords, the global hash seed-hashed incorrect passwords within the database.

10. The non-transitory computer-readable data storage medium of claim 1, wherein the processing further comprises:
  responsive to determining the first high-frequency hashed incorrect passwords, sending the first high-frequency hashed incorrect passwords and the first hash seed to a central attack-monitoring service monitoring a plurality of computing systems including the computing system.

11. The non-transitory computer-readable data storage medium of claim 1, wherein the processing further comprises:
  determining whether a given password was entered more than the threshold number of the attempts over the first and second periods of time.

12. The non-transitory computer-readable data storage medium of claim 11, wherein determining whether the given password was entered more than the threshold number of the attempts over the first and second periods of time comprises:
  one-way hashing the given password using the first hash seed;
  one-way hashing the given password using the second hash seed;
  determining a number of attempts the first hash seed-hashed given password was entered during the first time period, by comparing the first hash seed-hashed given password to the stored hashed first incorrect passwords for the first period of time; and
  determining a number of attempts the second hash seed-hashed given password was entered during the second time period, by comparing the second hash seed-hashed given password to the stored second hashed incorrect passwords for the second period of time.

13. The non-transitory computer-readable data storage medium of claim 12, wherein determining whether the given password was entered more than the threshold number of the attempts over the first and second periods of time further comprises:
  comparing a sum of the number of attempts the given password was entered during the first time period and the number of attempts the given password was entered during the second time period against the threshold number of the attempts.

14. The non-transitory computer-readable data storage medium of claim 13, wherein determining whether the given password was entered more than the threshold number of the attempts over the first and second periods of time further comprises:
  in response to the sum being greater than the threshold number of the attempts, determining that the given password was entered more than the threshold number of the attempts over the first and second time periods.

15. A method comprising:
receiving, by a central attack-monitoring service monitoring a plurality of computing systems, high-frequency one-way hashed incorrect passwords that correspond to incorrect passwords that were each entered more than a threshold number of attempts to access a corresponding computing system, regardless of a username for which the incorrect password was entered in any attempt, wherein the high-frequency one-way hashed incorrect passwords are hashed with a common global hash seed regardless of the computing systems from which the high-frequency one-way hashed incorrect passwords are received;
detecting, by the central attack-monitoring service, that selected computing systems of the plurality of computing systems are being subjected to or are at risk of a cyber attack based on the received high-frequency one-way hashed incorrect passwords, wherein the central attack- monitoring service determines which of the high-frequency one-way hashed incorrect passwords were received from more than one computing system in detecting that the selected computing systems are being subjected to or are at risk of the cyber attack; and
notifying, by the central attack-monitoring service, the selected computing systems that the selected computing systems are being subjected to or are at risk of the cyber attack.

16. The method of claim 15, wherein the selected computing systems are responsively configured to mitigate the cyber attack upon receiving notification from the central attack-monitoring service.

17. The method of claim 15, wherein the central attack-monitoring service receives the high-frequency one-way hashed incorrect passwords without receiving the usernames for which the incorrect passwords to which the high-frequency one-way hashed incorrect passwords were entered.

18. The method of claim 15, wherein the central attack-monitoring service provides the common global hash seed to the computing systems, and wherein the central attack-monitoring service periodically changes the common global hash seed over a plurality of time periods.

19. A computing system comprising:
a network adapter to connect to a network over which the computing system is susceptible to a cyber attack and over which the computing system is to communicate with a central attack- monitoring service monitoring a plurality of computing systems including the computing system;
a storage device to store a database of:
local high-frequency hashed incorrect passwords corresponding to incorrect passwords entered for usernames in more than a threshold number of attempts to access the computing system, each incorrect password one-way hashed using a local hash seed specific to the computing system and specific to a time period in which the incorrect password was entered;
global high-frequency hashed incorrect passwords received from the attack-monitoring service and corresponding to incorrect passwords entered for usernames across the plurality of computing systems in more than the threshold number of attempts, each incorrect password one-way hashed using a global hash seed common to the plurality of computing systems and specific to a time period in which the incorrect password was entered; and
hardware logic to:
responsive to an incorrect password being entered for a username in an attempt to access the computing system, generate a plurality of incorrect password hashes by one-way hashing the incorrect password using the local hash seed specific to each of a plurality of time periods and using the global hash seed specific to each time period;
determine whether the entered incorrect password matches the incorrect password to which any of the local or global high-frequency hashed incorrect passwords correspond, by accordingly comparing the incorrect password hashes to the local and global high-frequency hashed incorrect passwords; and
responsive to determining that the entered incorrect password matches the incorrect password to which any of the local or global high-frequency hashed incorrect passwords correspond, detect that the computing system is being subjected to the cyber attack.

20. The computing system of claim 19, wherein the hardware logic is further to:
responsive to detecting that the computing system is being subjected to the cyber attack, configure the computing system to mitigate the cyber attack.

* * * * *